United States Patent
Wada et al.

(10) Patent No.: US 11,776,251 B2
(45) Date of Patent: Oct. 3, 2023

(54) INFORMATION PROCESSING APPARATUS AND OBJECT DETECTION METHOD

(71) Applicant: Sony Interactive Entertainment Inc., Tokyo (JP)

(72) Inventors: Shinya Wada, Kanagawa (JP); Takayuki Ishida, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 371 days.

(21) Appl. No.: 17/273,780

(22) PCT Filed: Sep. 14, 2018

(86) PCT No.: PCT/JP2018/034293
§ 371 (c)(1),
(2) Date: Mar. 5, 2021

(87) PCT Pub. No.: WO2020/054076
PCT Pub. Date: Mar. 19, 2020

(65) Prior Publication Data
US 2021/0319218 A1    Oct. 14, 2021

(51) Int. Cl.
*G06V 10/145* (2022.01)
*G06V 20/10* (2022.01)

(52) U.S. Cl.
CPC ............ *G06V 20/10* (2022.01); *G06V 10/145* (2022.01)

(58) Field of Classification Search
None
See application file for complete search history.

(56) References Cited

U.S. PATENT DOCUMENTS

| | | | |
|---|---|---|---|
| 7,948,514 B2 | 5/2011 | Sato | |
| 9,626,767 B2 | 4/2017 | Ida | |
| 2010/0289878 A1 | 11/2010 | Sato | |
| 2016/0210754 A1 | 7/2016 | Ida | |

(Continued)

FOREIGN PATENT DOCUMENTS

| | | |
|---|---|---|
| EP | 0999518 A | 5/2000 |
| JP | 2016133396 A | 7/2016 |
| WO | 2009147814 A1 | 12/2009 |

OTHER PUBLICATIONS

International Preliminary Report on Patentability and Written Opinion for corresponding PCT Application No. PCT/JP2018/034293, 12 pages, dated Mar. 25, 2021.

(Continued)

*Primary Examiner* — Idowu O Osifade
(74) *Attorney, Agent, or Firm* — Matthew B. Dernier, Esq.

(57) ABSTRACT

An image acquisition section of an information processing apparatus acquires, from an imaging apparatus, polarization images in a plurality of orientations. A normal acquisition section of an image analysis section detects a surface of a subject by acquiring a normal vector on the basis of orientation dependence of polarization luminance. A surface assumption section assumes the presence of an undetected surface continuing from the detected surface. A subject detection section confirms whether or not the assumed surface is present using a normal vector estimated for the assumed surface. An output data generation section generates and outputs output data using information regarding the detected surface.

9 Claims, 15 Drawing Sheets

(56) References Cited

U.S. PATENT DOCUMENTS

| | | | |
|---|---|---|---|
| 2018/0075615 A1* | 3/2018 | Myokan | G06T 7/557 |
| 2018/0213170 A1* | 7/2018 | Segawa | H04N 23/843 |
| 2019/0079581 A1* | 3/2019 | Tsurumi | G06V 10/147 |
| 2019/0213739 A1* | 7/2019 | Ohba | G06T 7/74 |

OTHER PUBLICATIONS

International Search Report for corresponding PCT Application No. PCT/JP2018/034293, 2 pages, dated Dec. 18, 2018.

\* cited by examiner

FIG.3
SPECULAR REFLECTION
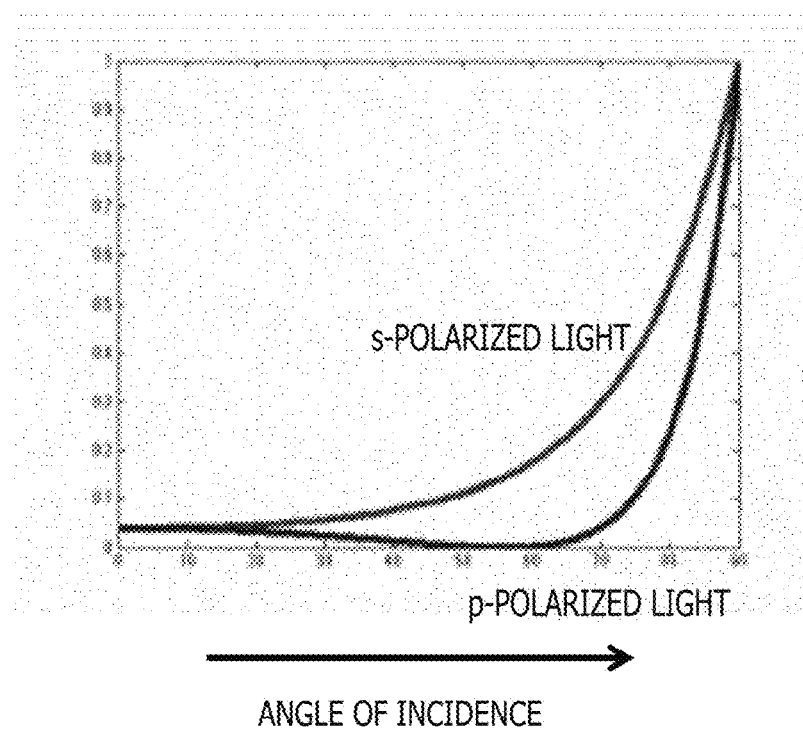
DIFFUSE REFLECTION
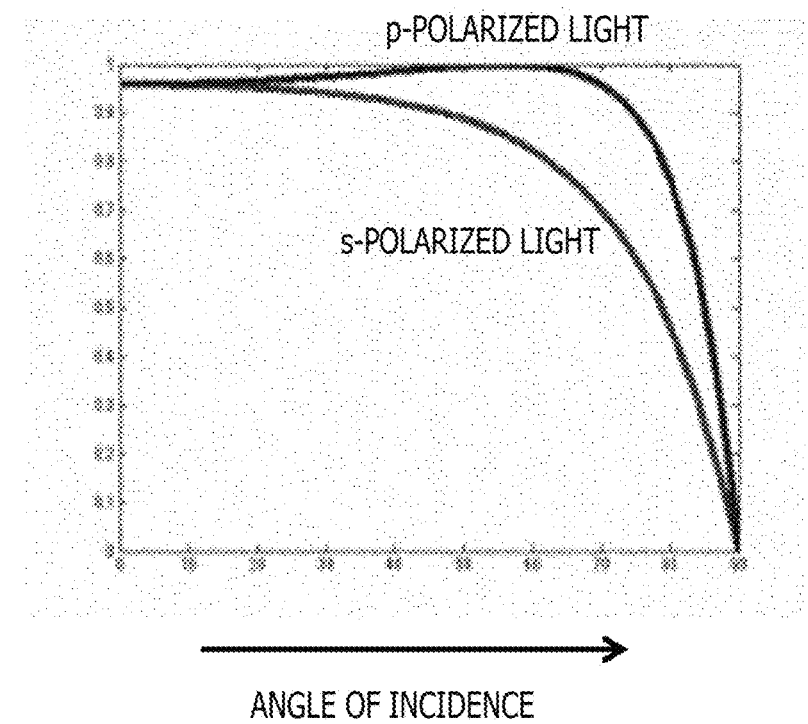

FIG. 5
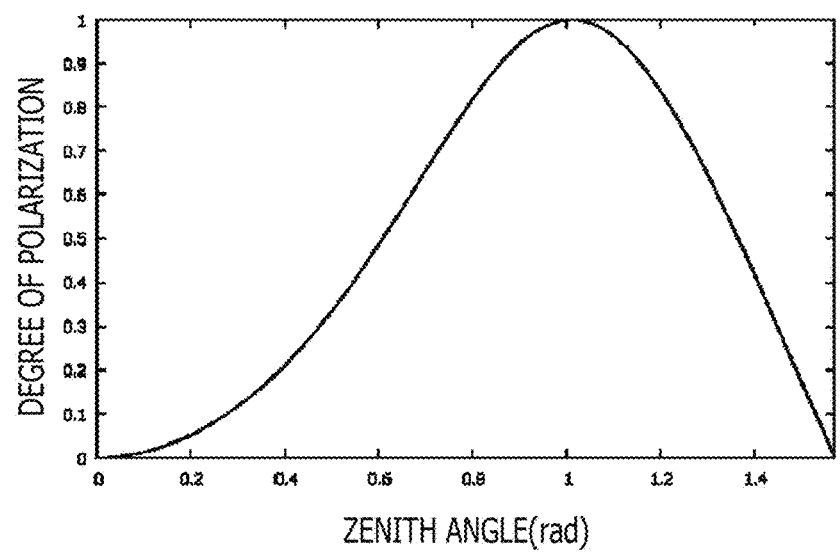
SPECULAR REFLECTION
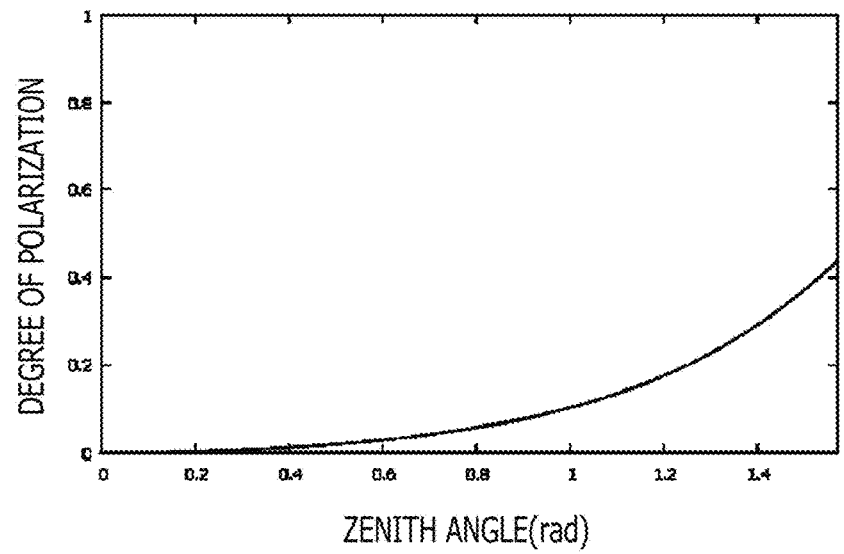
DIFFUSE REFLECTION
FIG. 6
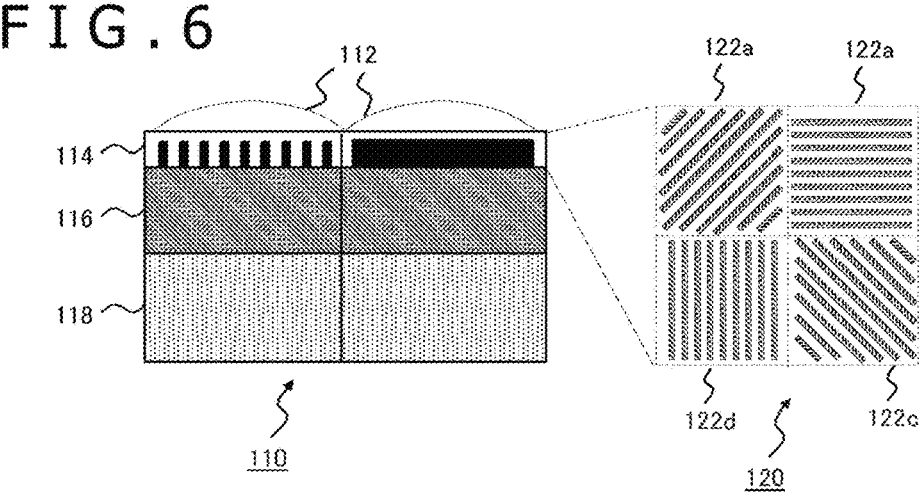

(a)　　　　　　　　　　　　(b)

(a)  (b)

INFORMATION PROCESSING APPARATUS AND OBJECT DETECTION METHOD

TECHNICAL FIELD

The present invention relates to an information processing apparatus and an object detection method for detecting a real object using captured images.

BACKGROUND ART

There are known games which involve capturing part of a body such as a user's head with a video camera, extracting predetermined regions such as the eyes, mouth, and hands, and using a display image obtained by replacing the extracted predetermined regions with other images (for example, see PLT 1). Further, there are also known user interface systems which receive the motions of the user's mouth and hands captured by a video camera as operating instructions for applications. In this manner, these techniques for capturing the real world and detecting the state of a target object or performing information processing on the basis thereof have been employed in extensive fields such as automatic control robots, surveillance cameras, automatic driving systems, and inspection apparatuses in manufacturing lines, as well as electronic content.

CITATION LIST

Patent Literature

[PTL 1] EP 0999518A

SUMMARY

Technical Problems

How an image of a subject appears in a captured image is affected by changes in the state of light due to the brightness of the surroundings, the number of objects, their arrangement, and the like. Thus, even if the subject is the same, the color of an image of the subject and luminance distribution thereof change significantly, or the outline fails to be clearly obtained. This may result in possible detection failure or possible confusion with another object. In particular, it is difficult to stably detect an object made of a material with high light transmittance, such as colorless glass or acrylic resin, because such a material has little color information and is susceptible to the surrounding situation.

The present invention has been made in view of these issues. It is an object of the present invention to provide a technique that can stably detect an object using captured images even if the object has high light transmittance.

Solution to Problems

One aspect of the present invention relates to an information processing apparatus. This information processing apparatus includes an image acquisition section configured to acquire, from an imaging apparatus, data of polarization images in a plurality of orientations, a normal acquisition section configured to detect a surface of a subject by acquiring a normal vector using the polarization images, a surface assumption section configured to assume presence of an undetected surface continuing from the detected surface, a subject detection section configured to confirm, using a normal vector estimated for the assumed surface, whether or not the surface is present and derive a definitive surface of the subject, and an output data generation section configured to generate and output data on the basis of information regarding the derived surface of the subject.

Still another aspect of the present invention relates to an object detection method. This object detection method is performed by an information processing apparatus and includes a step of acquiring, from an imaging apparatus, data of polarization images in a plurality of orientations, a step of detecting a surface of a subject by acquiring a normal vector using the polarization images, a step of assuming presence of an undetected surface continuing from the detected surface, a step of confirming, using a normal vector estimated for the assumed surface, whether or not the surface is present and deriving a definitive surface of the subject, and a step of generating and outputting output data on the basis of information regarding the derived surface of the subject.

It is noted that any combinations of the constituent components described above and the expressions of the present invention that are converted between a method, an apparatus, and the like are also effective as aspects of the present invention.

Advantageous Effect of Invention

According to the present invention, an object can be stably detected, using captured images, even if the object has high light transmittance.

BRIEF DESCRIPTION OF DRAWINGS

FIG. 3 depicts graphs comparing changes in the polarization direction with respect to the angle of incidence between specular reflection and diffuse reflection.

FIG. 5 depicts graphs comparing an example of changes in the degree of polarization with respect to the zenith angle of a normal vector between specular reflection and diffuse reflection.

FIG. 6 is a diagram illustrating an example of the structure of an imaging device including a polarizer layer that can be incorporated in an imaging apparatus according to the present embodiment.

DESCRIPTION OF EMBODIMENTS

Figure 1:
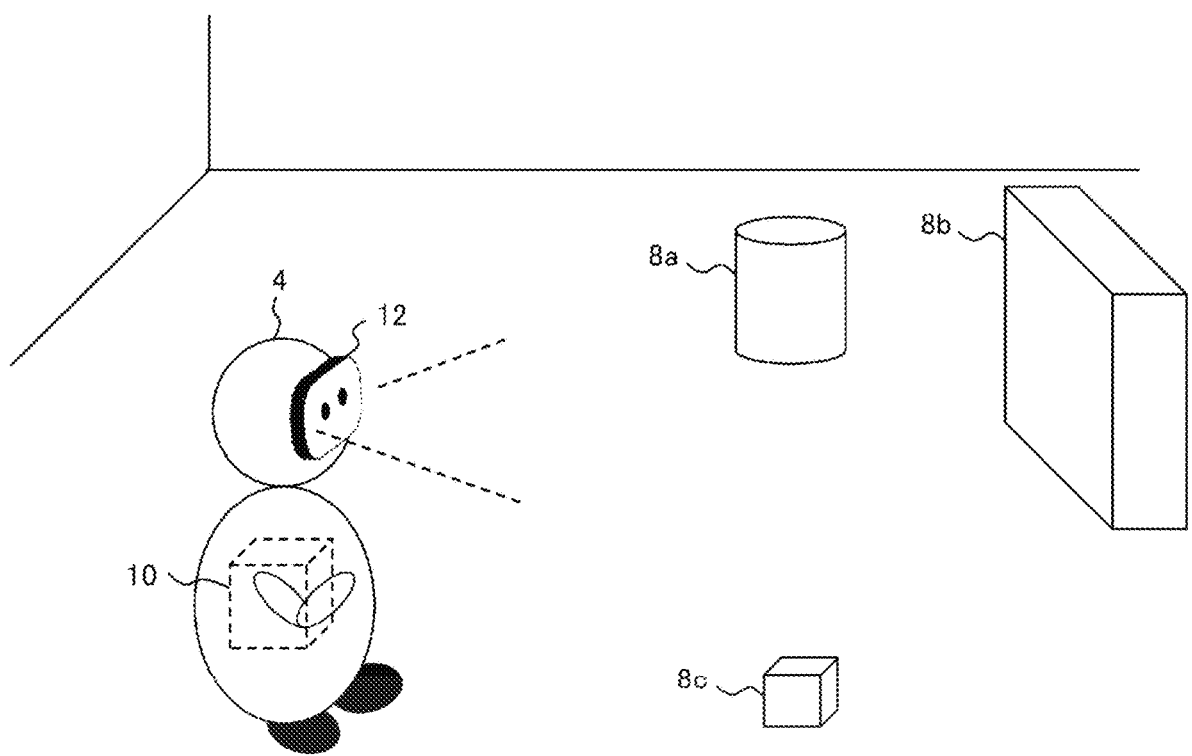
FIG. 1 is a diagram illustrating an example of a configuration of an information processing system according to the present embodiment.

The present embodiment basically detects an object that is present in a space or recognizes its position and attitude by analyzing images captured by an imaging apparatus. To this extent, there is no particular limitation on how the detection result is used. FIG. 1 illustrates an example of a configuration of an information processing system according to the present embodiment. In the illustrated example, it is assumed that a robot 4 including an imaging apparatus 12 walks while recognizing objects 8a, 8b, and 8c, which are present in the surroundings of the robot 4. The robot 4 includes an information processing apparatus 10 in its inside. The information processing apparatus 10 suitably operates the robot 4 by analyzing the captured images and recognizing the shape, distance, attitude, and the like of each of the objects 8a, 8b, and 8c.

Such a form is widely known for automatic control robots, unmanned guided vehicles, and the like with visual simultaneous localization and mapping (V-SLAM). It is noted that the information processing apparatus 10 may be an apparatus that remotely controls the robot 4 from the outside. Further, in another mode, the information processing apparatus 10 may cause a display apparatus, not illustrated, to display the result of object detection and the user may remotely operate the robot 4 using an input apparatus, not illustrated, while viewing the result. Alternatively, in still another mode, instead of the robot 4, the user may wear a head-mounted display including the imaging apparatus 12.

In this case, the information processing apparatus 10 may be incorporated into the head-mounted display or may be an external apparatus that can be connected to the head-mounted display through wireless or wired communication. At this time, the information processing apparatus 10 may generate a display image on the basis of the result of object detection and cause the head-mounted display to display the display image. At least a part of the display image may be an image captured by the imaging apparatus 12. The imaging apparatus 12 may be held by the user, and the information processing apparatus 10 may acquire the captured image wirelessly or by wire and analyze the captured image.

The user may hold a mobile terminal integrally including the imaging apparatus 12, the information processing apparatus 10, and a display apparatus not illustrated. Conceivably, various forms such as robot control systems, electronic content processing apparatuses, surveillance camera systems, and inspection apparatuses can employ the information processing apparatus 10. Depending on their purposes, therefore, information output from the information processing apparatus 10 can also vary, such as a control signal to the robot 4, a display image, and output audio.

These techniques are required to identify the objects 8a, 8b, and 8c and the surrounding situation as accurately as possible. However, it is difficult to depict an object made of a material with high light transmittance, such as glass or acrylic resin, as an image in a general color captured image. Thus, conceivably, an object made of such a material may not be recognized or another object behind or in front of the object is mistakenly recognized as if the object were there depending on the conditions of light beams. Therefore, in the present embodiment, the imaging apparatus 12 is used to observe polarized light in a subject space, so that an object made of a material with high light transmittance can be detected with accuracy using the characteristic of the polarized light.

Here, while the "material with high light transmittance" includes, for example, colorless glass, acrylic resin, and the like, the target light transmittance and color are not limited. In other words, the purpose is not to limit detection targets but to suppress, as a whole, the occurrence of misrecognition caused by image-capturing by enabling objects, including the ones that are likely to be overlooked with a general color captured image, to be detected in an exhaustive manner. Hereinafter, an object made of a "material with high light transmittance" will be referred to as a "transparent object."

Figure 2:
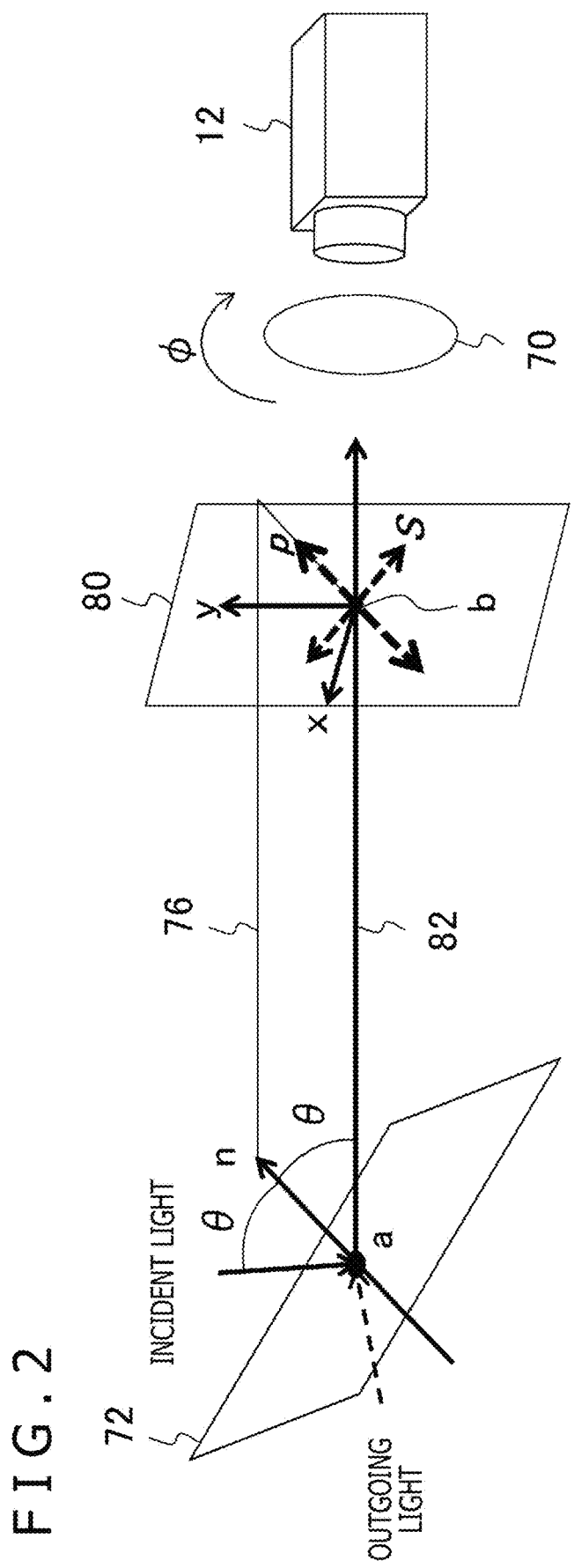
FIG. 2 is a diagram for describing the basic characteristic of polarized light used in the present embodiment.

FIG. 2 is a diagram for describing the basic characteristic of polarized light used in the present embodiment. The imaging apparatus 12 captures a space including a subject 72 through a linear polarizer 70. More specifically, the imaging apparatus 12 observes polarized light that oscillates in a direction determined by the linear polarizer 70 among reflected light beams including specular reflection components and diffuse reflection components. A specular reflection component is formed by light emitted from a light source and reflecting off the subject 72. A diffuse reflection component is formed by light scattered inside the subject 72 and outgoing from its surface. A plane including a normal vector n at an observation point a on the surface of the subject 72 and a light beam 82 reaching an imaging point b on an image plane 80 from the point a will be referred to as an incidence plane 76 at the observation point a.

Of the light beam 82, the linear polarizer 70 transmits only linearly polarized light oscillating in a certain direction. Hereinafter, the direction in which the polarized light to be transmitted oscillates will be referred to as a transmission axis of the linear polarizer 70. Rotating the linear polarizer 70 around an axis perpendicular to the plane can make the transmission axis oriented in a desired direction. If the light arriving at the imaging apparatus 12 is unpolarized, the observed luminance is constant even if the linear polarizer 70 is rotated. On the other hand, general reflected light is partially polarized. Thus, the luminance observed with respect to the direction of the transmission axis varies. Further, how the luminance changes varies depending on the ratio of specular reflection to diffuse reflection and the angle of incidence.

FIG. 3 compares changes in the polarization direction with respect to the angle of incidence between specular reflection and diffuse reflection. Here, "s-polarized light" refers to a component that oscillates in the direction perpendicular to an incidence plane, while "p-polarized light" refers to a component that oscillates in the direction parallel to the incidence plane. In both specular reflection and diffuse reflection, the ratio of s-polarized light to p-polarized light depends on the angle of incidence. Further, in the case of the light of specular reflection, s-polarized light is dominant regardless of the angle of incidence. For this reason, the observed luminance is maximum when the transmission axis of the linear polarizer 70 is perpendicular to the incidence plane, while the observed luminance is minimum when the transmission axis is parallel to the incidence plane.

The light of diffuse reflection is opposite; the observed luminance is maximum when the transmission axis of the linear polarizer 70 is parallel to the incidence plane, while the observed luminance is minimum when the transmission axis is perpendicular to the incidence plane. Therefore, changes in polarization luminance at the imaging point b obtained by capturing polarization images in various transmission axis directions include information regarding the angle of the incidence plane 76 and the angle of incident light (or outgoing light), that is, information regarding the zenith angle θ of the normal vector n at the observation point a on the subject 72. The present embodiment utilizes such changes in polarization luminance.

Figure 4:
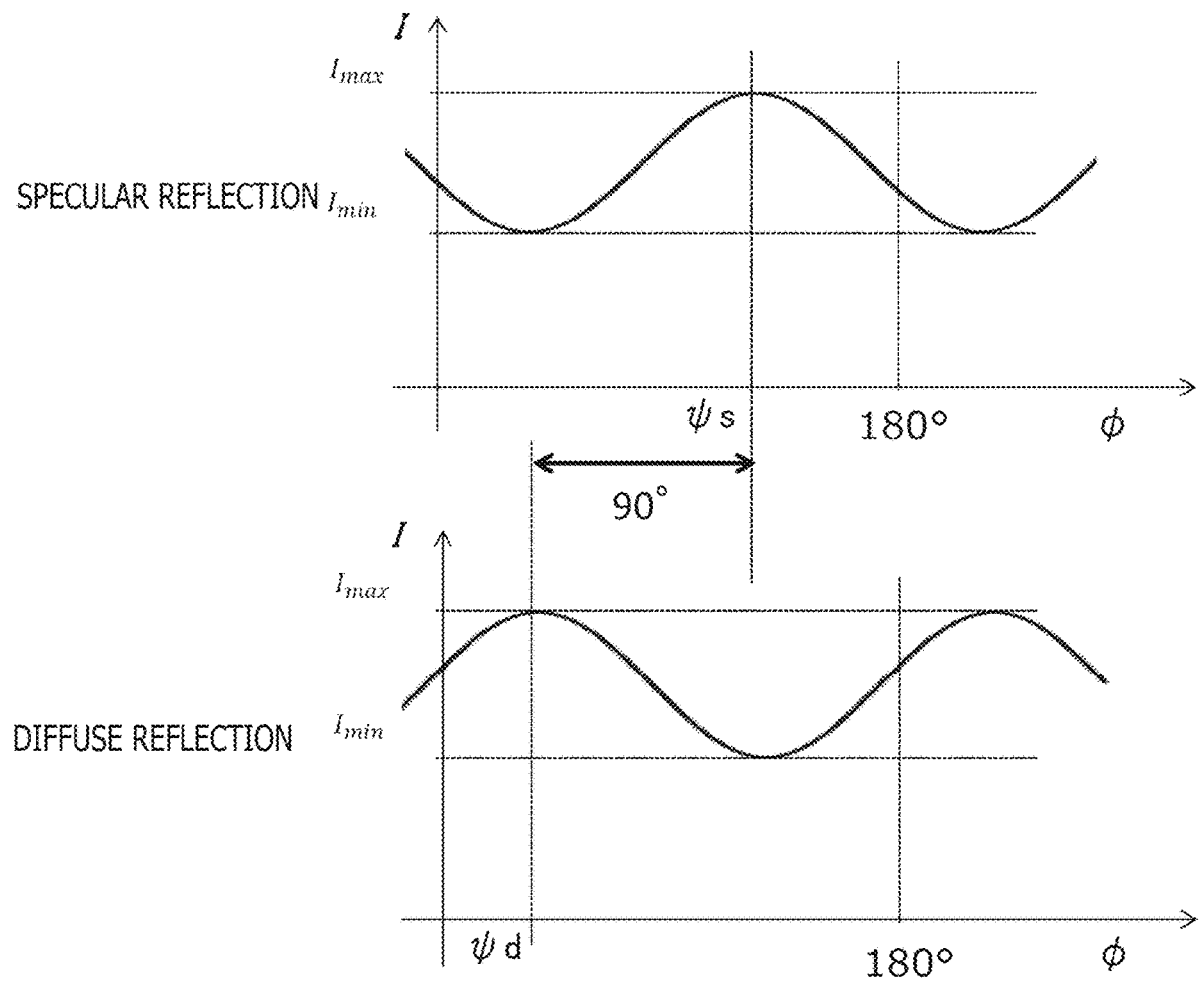
FIG. 4 depicts graphs illustrating changes in luminance with respect to a polarization orientation in the present embodiment.

FIG. 4 illustrates changes in luminance I with respect to a polarization orientation ϕ. The upper part of this figure illustrates a case where specular reflection is dominant, while the lower part illustrates a case where diffuse reflection is dominant. Both have a sine wave shape with a period of 180°. Meanwhile, there is a difference of 90° between a polarization orientation ψs in a case where the luminance I of specular reflection has the maximum value $I_{max}$ and a polarization orientation ψd in a case where the luminance I of diffuse reflection has the maximum value $I_{max}$. This is due to the fact that s-polarized light is dominant in specular reflection while p-polarized light is dominant in diffuse reflection, as described above.

Considering that s-polarized light is oscillation perpendicular to the incidence plane and p-polarized light is oscillation parallel to the incidence plane, the polarization orientation (ψs−90°) in a case where the luminance is minimum in specular reflection or the polarization orientation ψd in a case where the luminance is maximum in diffuse reflection represents the angle of the incidence plane. Since the normal vector n is always included in the incidence plane, this angle represents the angle of the vector projecting the normal vector n onto a captured image plane. This angle is generally referred to as the azimuth angle of the normal vector n. Obtaining the above-described zenith angle in addition to the azimuth angle uniquely determines the normal vector in a three-dimensional space viewed from the imaging apparatus 12. The polarization orientation in a case where the luminance of the observed polarized light is maximum is referred to as a phase angle ψ. The changes in luminance I illustrated in FIG. 4 can be expressed by the following equation using the phase angle ψ.

[Math. 1]

$$I = \frac{I_{max} + I_{min}}{2} + \frac{I_{max} + I_{min}}{2}\cos(2\phi - 2\psi) \quad \text{(Equation 1)}$$

$I_{max}$, $I_{min}$, and ψ can be obtained by approximating the luminance observed with respect to each of a plurality of polarization orientations φ by rotating the linear polarizer 70 to the form of the equation 1 using the least-squares method or the like. Using $I_{max}$ and $I_{min}$ among them, the degree of polarization ρ is obtained by the following equation.

[Math. 2]

$$\rho = \frac{I_{max} - I_{min}}{I_{max} + I_{min}} \quad \text{(Equation 2)}$$

FIG. 5 compares an example of changes in the degree of polarization with respect to the zenith angle of a normal vector between specular reflection and diffuse reflection. In the case of specular reflection illustrated in the upper part, the degree of polarization takes values up to 1.0, whereas the degree of polarization of diffuse reflection illustrated in the lower part is approximately 0.4 at a maximum. It is noted that the zenith angle θ is related to the degree of polarization $\rho_s$ in the case of specular reflection and to the degree of polarization $\rho_d$ in the case of diffuse reflection as follows.

[Math. 3]

$$\rho_s = \frac{2\sin^2\theta\cos\theta\sqrt{\eta^2 - \sin^2\theta}}{\eta^2 - \sin^2\theta - \eta^2\sin^2\theta + 2\sin^4\theta} \quad \text{(Equation 3)}$$

$$\rho_d = \frac{(\eta - 1/\eta)^2\sin^2\theta}{2 + 2\eta^2 - (\eta + 1/\eta)^2\sin^2\theta + 4\cos\theta\sqrt{\eta^2 - \sin^2\theta}}$$

Here, η represents the refractive index of the object. The zenith angle θ is obtained by substituting the degree of polarization ρ obtained with the equation 2 into either $\rho_s$ or $\rho_d$ in the equation 3. With the azimuth angle α and the zenith angle θ obtained in this manner, a normal vector ($p_x$, $p_y$, $p_z$) is obtained as follows.

[Math. 4]

$$\begin{pmatrix} p_x \\ p_y \\ p_z \end{pmatrix} = \begin{pmatrix} \cos\alpha\cos\theta \\ \sin\alpha\cos\theta \\ \sin\theta \end{pmatrix} \quad \text{(Equation 4)}$$

It is noted that, in the present embodiment, the method for observing the polarization luminance is not limited to the linear polarizer. For example, a polarizer layer may be provided as a part of an imaging device structure. FIG. 6 illustrates an example of the structure of an imaging device including a polarizer layer that can be incorporated in the imaging apparatus 12 according to the present embodiment. It is noted that this figure schematically illustrates the functional structure of the cross-section of the device and omits its detailed structure such as an interlayer insulation film, wiring, and the like. An imaging device 110 includes a microlens layer 112, a wire-grid type polarizer layer 114, a color filter layer 116, and a light detection layer 118.

The wire-grid type polarizer layer 114 includes polarizers each including a plurality of linear conductive members arranged in stripes at intervals smaller than the wavelength of incident light. When the light condensed by the microlens layer 112 enters the wire-grid type polarizer layer 114, polarization components having an orientation parallel to the polarizer lines are reflected and only polarization components having an orientation perpendicular thereto are transmitted therethrough. The light detection layer 118 detects the transmitted polarization components, so that a polarization image is acquired. The light detection layer 118 has a semiconductor device structure of a general charge coupled device (CCD) image sensor, a general complementary metal oxide semiconductor (CMOS) image sensor, or the like.

The wire-grid type polarizer layer 114 includes an array of polarizers whose orientations of polarized light to be transmitted vary in charge read units, that is, in units of pixels or in larger units, in the light detection layer 118. The right side of this figure illustrates a polarizer array 120 as viewed from the top side of the wire-grid type polarizer layer 114. In this figure, the hatched lines denote the conductors (wires) configuring each polarizer. It is noted that the squares denoted by broken lines denote regions of the respective polarizers each having a single direction and the broken lines themselves are not actually formed.

In the illustrated example, the polarizers with four directions are arranged in four regions 122a, 122b, 122c, and 122d, in two rows and two columns. In the figure, the polarizers diagonally positioned to each other have their transmission directions set perpendicular to each other. The adjacent polarizers have a difference of 45° therebetween. That is, the polarizers with four directions at intervals of 45° are provided. These polarizers replace the linear polarizer 70. The light detection layer 118 under the polarizers can acquire polarization information in four orientations at intervals of 45° in regions corresponding to the respective four regions 122a, 122b, 122c, and 122d. A predetermined number of such polarizer arrays are further arranged vertically and horizontally and connected to a peripheral circuit that controls the charge read timings. This arrangement can implement an image sensor that simultaneously acquires polarization information in four orientations as two-dimensional data.

The imaging device 110 illustrated in the figure includes the color filter layer 116 interposed between the wire-grid type polarizer layer 114 and the light detection layer 118. The color filter layer 116 includes an array of filters each transmitting a corresponding one of red light, green light, and blue light corresponding to each pixel, for example. With this arrangement, polarization information is obtained by color according to a combination of the direction of the polarizer in the wire-grid type polarizer layer 114 positioned above and the color of the filter in the color filter layer 116 positioned below. That is, polarization information for the same orientation and the same color is obtained discretely on an image plane. Thus, the information obtained in this manner is interpolated as needed to obtain a polarization image for each orientation and each color.

Further, it is also possible to perform operation on the polarization images having the same color to reproduce an unpolarized color image. An image acquisition technique using the wire-grid type polarizer is also disclosed in, for example, JP 2012-80065A or the like. It is noted that, since the present embodiment basically uses polarization luminance images, the color filter layer 116 can be omitted in the case of other applications where color images are not needed. Further, the polarizers are not limited to the wire-grid type and can be linear dichroic polarizers or the like.

As described above, the polarization characteristic of light reflected off the surface or inside of a subject includes information regarding the inclination of the surface of the subject to the imaging plane, eventually, information regarding the shape and attitude of the subject. This makes it easier to detect a transparent object compared to a general color image representing color information of the subject. Meanwhile, in some cases, the objects 8a, 8b, and 8c are captured from a freely selected viewpoint as illustrated in FIG. 1. In other cases, conversely, an object is moving with respect to the imaging plane. In such cases, it is, in some cases, difficult to detect a transparent object even using polarized light, depending on the angle of the image-capturing viewpoint to the transparent object.

Figure 7:
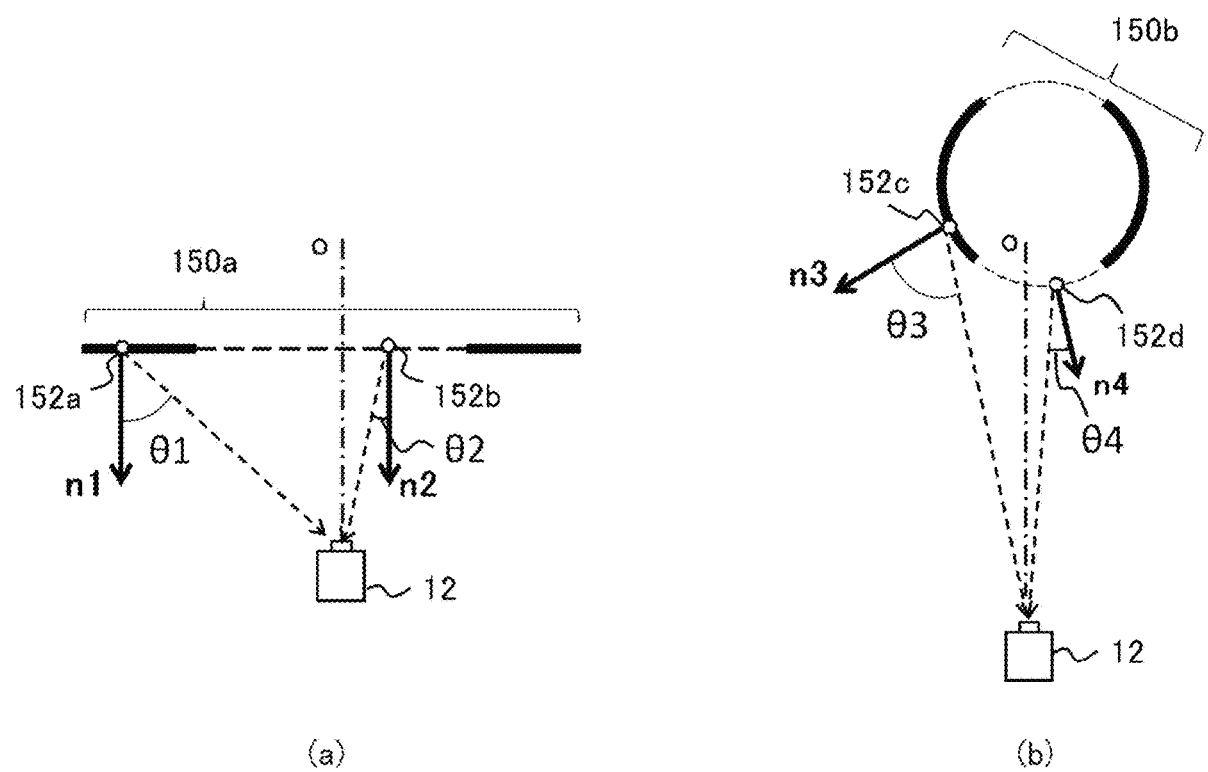
FIG. 7 depicts diagrams for describing a phenomenon in which the subject detection accuracy decreases depending on the angle of the image-capturing viewpoint to a transparent object.

FIG. 7 depicts diagrams for describing a phenomenon in which the subject detection accuracy decreases depending on the angle of the image-capturing viewpoint to a transparent object. Respective overhead views illustrated in (a) and (b) illustrate a planar subject 150a and a cylindrical subject 150b being captured by the imaging apparatus 12. It is noted that the surfaces of the subjects are denoted by the solid lines and the broken lines for the purpose of description and are uniform in reality. With reference to (a), by capturing the subject 150a, the polarization luminance of a light beam to the imaging apparatus 12 from each position on the surface is obtained as a pixel value. For example, look at observation points 152a and 152b. While normal vectors n1 and n2 are in the same direction, the angles of the light beams incident on the imaging apparatus 12 are different from each other.

Specifically, an angle θ1 between the normal vector n1 and the light beam at the observation point 152a is larger than an angle θ2 between the normal vector n2 and the light beam at the observation point 152b. An angle to an optical axis o of the imaging apparatus 12 is large at the observation point 152a, while an angle to the optical axis o is small at the observation point 152b. Here, the angles θ1 and θ2 are none other than the zenith angles of the normal vectors n1 and n2 at the respective observation points 152a and 152b. Assume that specular reflection is dominant in the observed light. In this case, as illustrated in the upper part of FIG. 5, a high degree of polarization is obtained in the range of approximately 0.6 rad to 1.3 rad of the zenith angle, while the degree of polarization decreases as the zenith angle is away from that range.

For example, in the case of glass, the Brewster's angle at which only an s-polarized light component is completely polarized with the reflectivity of the p-polarized light being 0 is approximately 56° (0.98 rad). Therefore, when a polarization image is analyzed as described above, the degree of polarization is high at the observation point 152a, while the degree of polarization is low at the observation point 152b, making it difficult to obtain a proper normal vector. As a result, although portions of the planar subject 150a denoted by the solid lines are detected, a portion denoted by the broken line is not detected.

As illustrated in FIG. 5, the degree of polarization gradually changes according to the zenith angle. In reality, therefore, the detection accuracy deteriorates as the position becomes closer to a position on the surface of the subject 150a that intersects the optical axis o of the imaging apparatus 12. This similarly applies to the cylindrical subject 150b illustrated in (b). That is, an angle θ3 between a normal vector n3 and a light beam at an observation point 152c is larger than an angle θ4 between a normal vector n4 and a light beam at an observation point 152d. An angle from the optical axis o of the imaging apparatus 12 is large at the observation point 152c, while an angle from the optical axis o is small at the observation point 152d.

Therefore, although the degree of polarization is high at the observation point 152c, the degree of polarization is low at the observation point 152*b*, which makes the accuracy of detecting the normal vector deteriorate. As a result, although portions of the cylindrical subject 150*b* denoted by the solid lines are detected, portions denoted by the broken lines are not detected. This phenomenon can occur regardless of the shape of the subject.

In a case where the subject is a transparent object, it is difficult to detect the transparent object even from color information denoted by a color captured image. This generates a portion that cannot be detected from the captured image. Therefore, to improve the detection accuracy in the present embodiment, the surface of a subject is assumed to continue from a portion where the detection result is properly obtained in the direction in which the angle to the optical axis o of the imaging apparatus 12 becomes small, and under this assumption, polarized light is used to confirm whether or not the surface is actually present.

Figure 8:
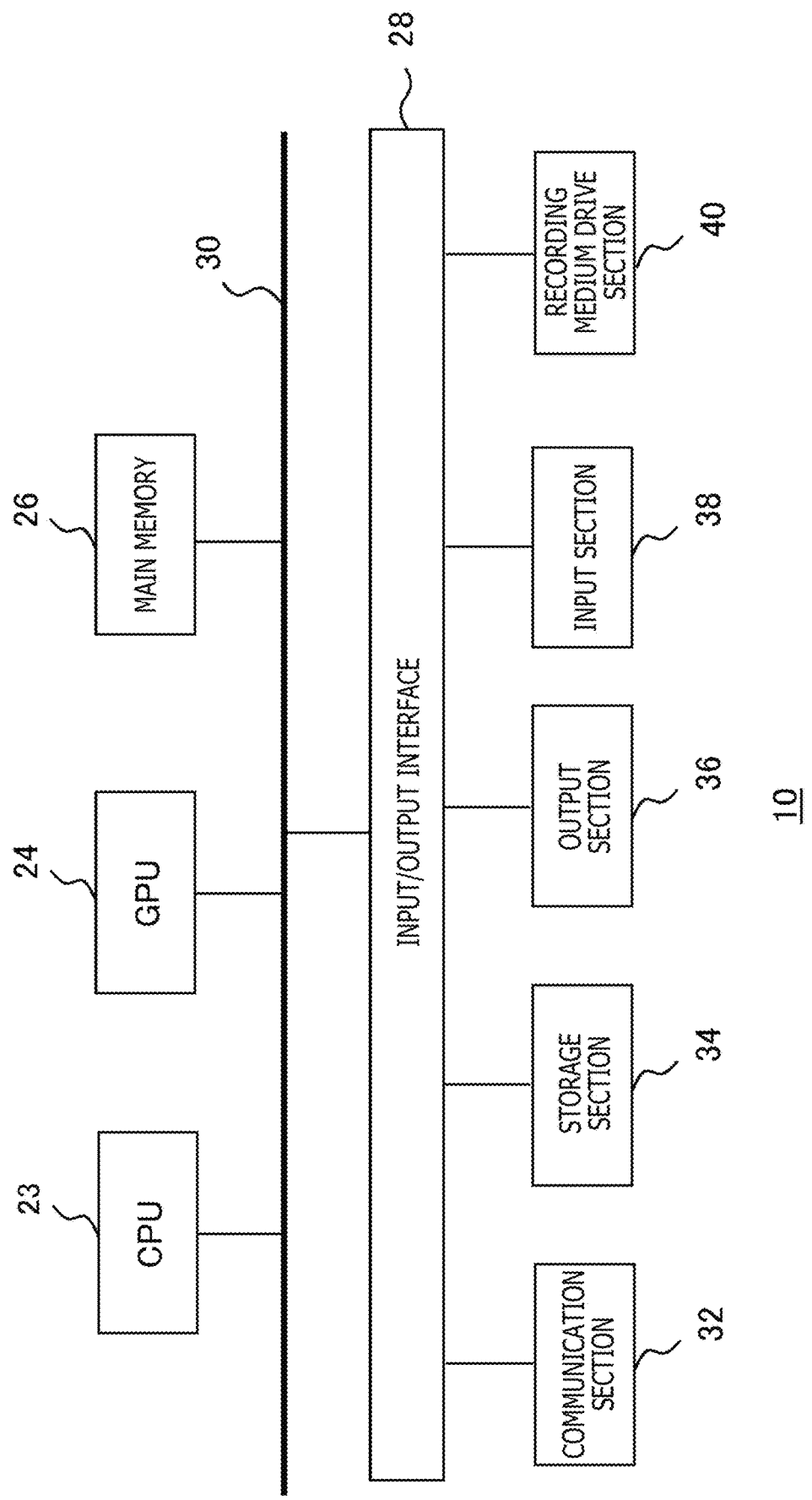
FIG. 8 is a diagram illustrating an internal circuit configuration of an information processing apparatus according to the present embodiment.

FIG. 8 illustrates an internal circuit configuration of the information processing apparatus 10. The information processing apparatus 10 includes a central processing unit (CPU) 23, a graphics processing unit (GPU) 24, and a main memory 26. Each of these sections is interconnected via a bus 30. To the bus 30, an input/output interface 28 is further connected. Peripheral equipment interfaces such as a universal serial bus (USB) and Institute of Electrical and Electronic Engineers (IEEE) 1394, a communication section 32, a storage section 34, an output section 36, an input section 38, and a recording medium drive section 40 are connected to the input/output interface 28. The communication section 32 includes a wired or wireless local area network (LAN) network interface. The storage section 34 includes a hard disk drive, a non-volatile memory, and the like. The output section 36 outputs data to a control mechanism of the robot 4, the display apparatus, not illustrated, and the like. The input section 38 receives data from the imaging apparatus 12 and the input apparatus, not illustrated. The recording medium drive section 40 drives a removable recording medium such as a magnetic disk, an optical disc, or a semiconductor memory.

The CPU 23 controls the entire information processing apparatus 10 by executing an operating system stored in the storage section 34. The CPU 23 also executes various kinds of programs that are loaded into the main memory 26 after being read from the removable recording medium or downloaded via the communication section 32. The GPU 24 has functions of a geometry engine and a rendering processor and performs drawing processing according to drawing instructions from the CPU 23 and stores display image data in a frame buffer, not illustrated.

Then, the display image stored in the frame buffer is converted into a video signal and output to the output section 36. The main memory 26 includes a random access memory (RAM) and stores programs and data necessary for processing. It is noted that, as described above, there are various possible applications with the present embodiment. Therefore, a part of the illustrated configuration may be omitted or replaced with another circuit, depending on the output form of processing results corresponding to the application.

Figure 9:
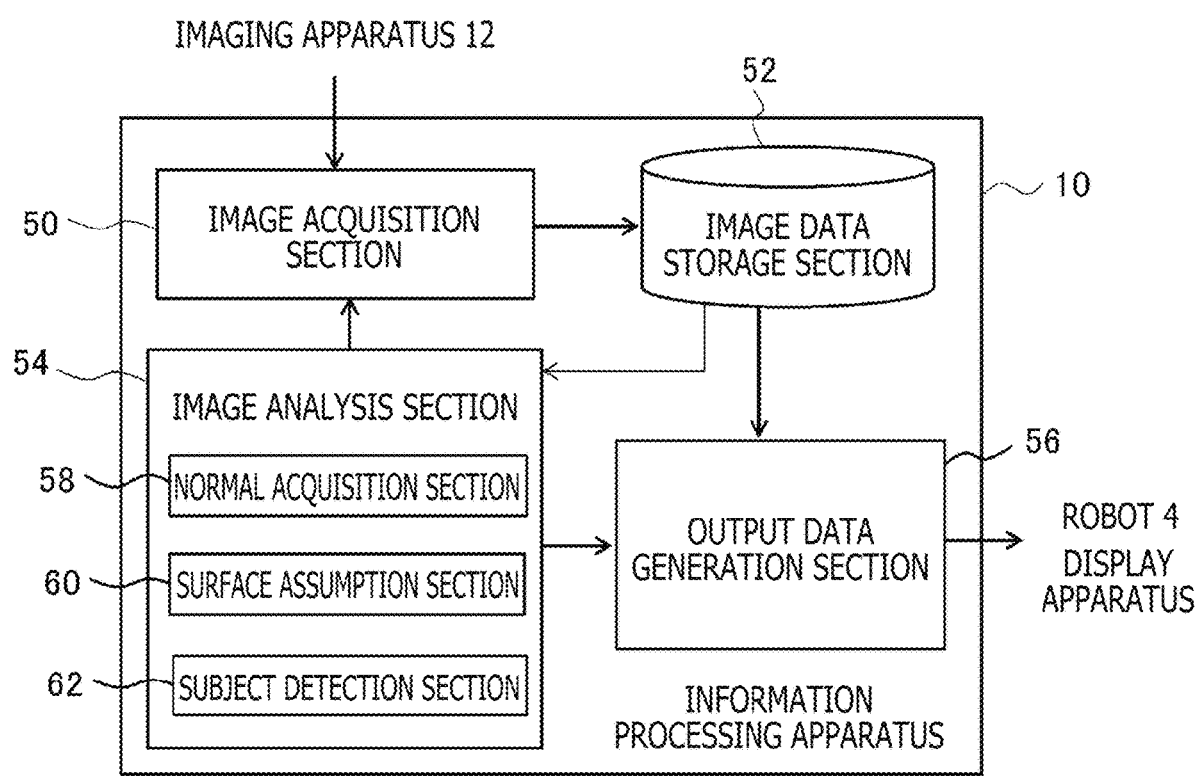
FIG. 9 is a diagram illustrating a functional block configuration of the information processing apparatus according to the present embodiment.

FIG. 9 illustrates a functional block configuration of the information processing apparatus 10 according to the present embodiment. The individual components described in this figure as functional blocks that perform various processes can be configured by each main circuit, in terms of hardware, such as the CPU 23, the GPU 24, the main memory 26, and the like illustrated in FIG. 8 and are implemented by a program or the like, in terms of software, loaded into the main memory 26 from a recording medium driven by the recording medium drive section 40 or from the storage section 34. Thus, it will be understood by those skilled in the art that these functional blocks can be implemented by hardware only, software only, or a combination thereof in various forms and are not limited to any of these forms.

The information processing apparatus 10 includes an image acquisition section 50, an image data storage section 52, an image analysis section 54, and an output data generation section 56. The image acquisition section 50 acquires data of captured images from the imaging apparatus 12. The image data storage section 52 stores data of the acquired images. The image analysis section 54 performs image analysis, including detection of a subject. Using the analysis result, the output data generation section 56 generates data to be output.

The image acquisition section 50 is implemented by the input section 38, the CPU 23, and the like of FIG. 8 and acquires data of captured images including polarization images from the imaging apparatus 12. At this time, the image acquisition section 50 acquires, as the polarization images, at least data of polarization images in three orientations corresponding to the transmission axes in three directions. A polarization image may be captured each time the linear polarizer 70 provided in front of the imaging apparatus 12 is rotated as illustrated in FIG. 2 and stopped in a predetermined direction, or may be captured by using the image sensor including the imaging device having the structure illustrated in FIG. 6. In the latter case, polarization images in a plurality of orientations can be acquired by single image-capturing.

The image acquisition section 50 may also acquire data of a general color captured image, depending on the purpose of the information processing and the contents of the image analysis, such as a case where the captured image is used as a display image to be output. Further, the captured image to be acquired may be a moving image or a still image. Moreover, in a case where the imaging apparatus 12 is a stereo camera including two cameras with a known space provided therebetween, the image acquisition section 50 may acquire data of right and left stereo images having disparity therebetween and captured by those cameras. The image acquisition section 50 sequentially stores the data of the acquired captured images in the image data storage section 52.

The image analysis section 54 is implemented by the CPU 23, the GPU 24, and the like of FIG. 8 and performs image analysis including detection of a subject using data stored in the image data storage section 52. More specifically, the image analysis section 54 includes a normal acquisition section 58, a surface assumption section 60, and a subject detection section 62. The normal acquisition section 58 derives normal vectors of the subject using changes in polarization luminance with respect to changes in orientation as described above. Specifically, first, the normal acquisition section 58 extracts the luminance at each of corresponding pixels of polarization images in a plurality of orientations to derive changes in luminance with respect to each of the polarization orientations.

If there are polarization images in three orientations of $\phi 1$, $\phi 2$, and $\phi 3$, a curve passing through their three coordinates ($\phi 1$, I1), ($\phi 2$, I2), and ($\phi 3$, I3) is approximated to the function of the equation 1 using the least-squares method or the like, so that a continuous function illustrated in FIG. 4 is obtained. From this function, the maximum luminance $I_{max}$ and the minimum luminance $I_{min}$ are obtained, and the degree of polarization $\rho$ and the normal vector are obtained using the equations 2 to 4. By repeating this processing for each pixel, the distribution of normal vectors with respect to an image plane is obtained, and the shape and attitude of an object present in the subject space can be identified.

The normal acquisition section 58 may separately detect the subject on the basis of color information of an image. For example, the color information may be acquired by averaging the luminances of the polarization images in the plurality of orientations for each corresponding pixel and color or may use a natural light image captured in a corresponding field of view. Existing techniques can be used to detect an object using color information. However, at this stage, there is a possibility that a normal vector is not obtained or the accuracy of a normal vector is low in a part of regions of the subject, depending on a positional relation and angle to the imaging apparatus 12, as described above. Even with color information, accurately detecting a transparent object is difficult.

The surface assumption section 60 assumes the presence of a surface in view of the continuity of the subject surface and the like using the distribution of the normal vectors acquired by the normal acquisition section 58. At this time, the surface assumption section 60 may assume a more probable surface on the basis of spatial information such as the position of the light source and the type of an object present in the subject space that have been acquired separately. Specific examples will be described later.

The subject detection section 62 confirms whether or not the surface assumed to be present by the surface assumption section 60 is actually present and derives a definitive detection result according to this result. Conceivable confirmation methods are as follows: (1) a mode of causing the imaging apparatus 12 to move to an appropriate position and perform image-capturing again; (2) a mode of evaluating a relation between s-polarized light and p-polarized light on the basis of the normal of the assumed surface; and (3) a mode of checking a change in an image when the imaging apparatus 12 is moved. Specific examples will be described later. It is noted that the information definitively derived by the subject detection section 62 is not limited to the distribution of normal vectors. For example, the subject detection section 62 may only suggest that the surface is present at the assumed position or may generate data representing the position or attitude of the subject on the basis of the distribution of the normal vectors.

The output data generation section 56 is implemented by the CPU 23, the GPU 24, the output section 36, and the like of FIG. 8. The output data generation section 56 performs predetermined information processing on the basis of the information identified by the image analysis section 54 and generates data to be output, such as a control signal to the robot, a display image, and audio. The output data generation section 56 then outputs the data. As described above, there is no particular limitation on the contents of the information processing to be performed here and the type of output data. For example, a control signal for changing the direction may be transmitted if a glass window is found to be present in front of the robot, or a control signal for holding a subject including a detected transparent object may be transmitted.

Alternatively, an image or audio may be generated to indicate the presence of an object and then output to the display apparatus. Alternatively, a display image depicting virtual reality or augmented reality may be generated by replacing the detected subject with a virtual object or the like and then output to the display apparatus. In this case, the virtual object may be drawn so as to match the shape and attitude of the subject on the basis of the distribution of the normal vectors acquired by the image analysis section 54. In a case where the image acquisition section 50 acquires stereo image data, the distance to the subject may be obtained using the stereo image data and reflected in the output data. The technique for extracting corresponding points from stereo images and obtaining the distance to the subject using the principle of triangulation from the positional deviation on an image plane is widely known.

To acquire more detailed distance information, the distance information for each of the corresponding points obtained in this manner may be integrated with normal vector information acquired by the image analysis section 54. Further, the output data generation section 56 also outputs information necessary for the subject detection section 62 to confirm the presence of the assumed surface. Specifically, the output data generation section 56 generates a control signal for causing the imaging apparatus 12 to move to an appropriate position and perform image-capturing, and transmits the control signal to the robot 4. Alternatively, the output data generation section 56 may generate an image or audio for instructing the user wearing or holding the imaging apparatus 12 on the moving direction and image-capturing timing and transmit the image or audio to the display apparatus or a speaker, respectively.

Figure 10:
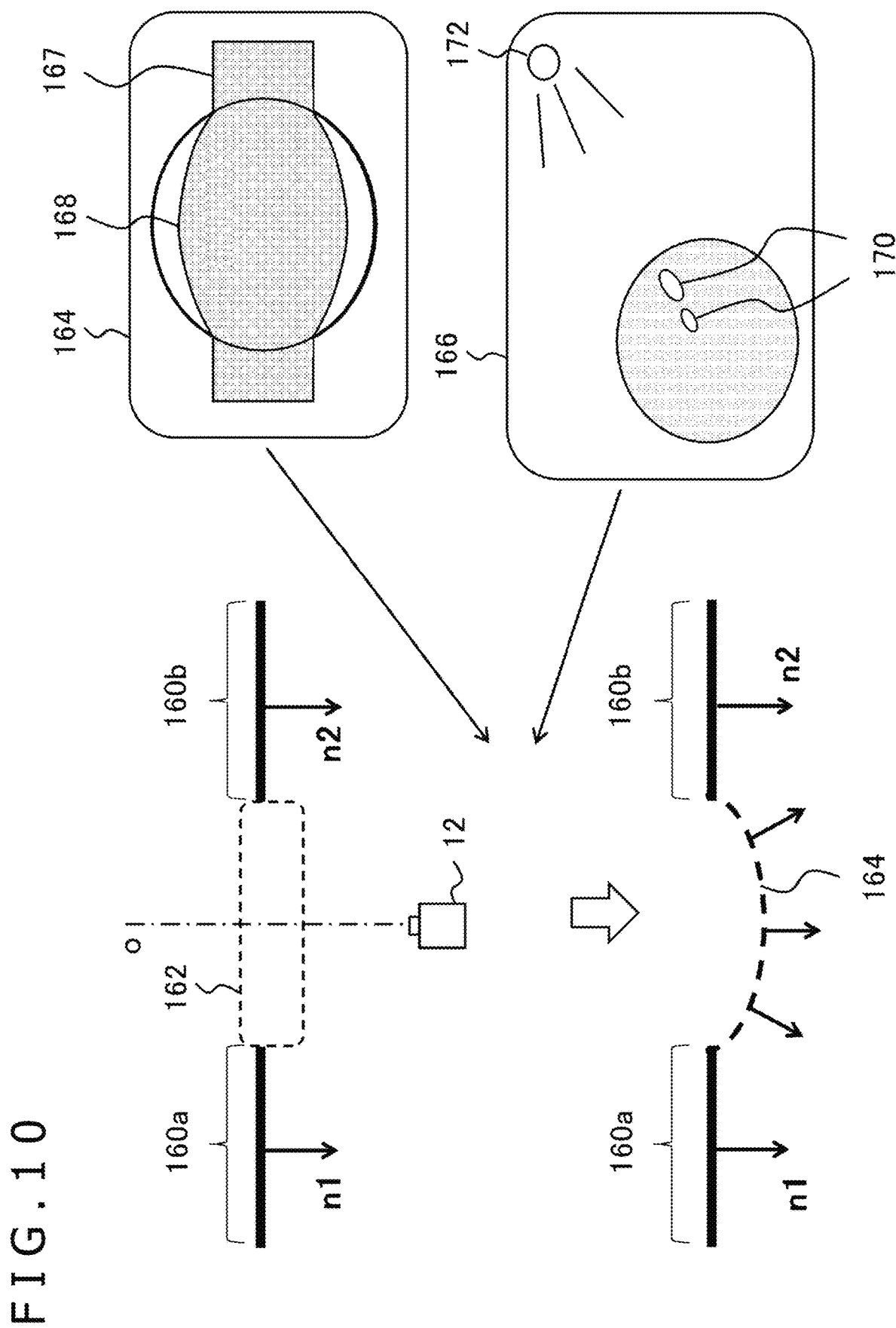
FIG. 10 is a diagram for describing a method by which a surface assumption section assumes the surface of a subject in the present embodiment.

FIG. 10 is a diagram for describing a method by which the surface assumption section 60 assumes the surface of a subject. As illustrated in FIG. 7, assume that surfaces 160a and 160b of a subject have been detected and normal vectors n1 and n2 have been obtained. For example, regions where the degree of polarization larger than a threshold value set in advance can be obtained are defined as the "detected" surfaces 160a and 160b. The surface assumption section 60 evaluates the possibility of a surface being present in a region 162 therebetween. Qualitatively, as illustrated in FIG. 7, the surface assumption section 60 estimates the presence of the surface extended from the detected surfaces 160a and 160b in the direction in which the angle to the optical axis o of the imaging apparatus 12 is small.

For example, as illustrated in the figure, in a case where the normal vectors n1 and n2 are the same on the detected surfaces 160a and 160b or the ratio of a change therebetween is smaller than a threshold value, the surface assumption section 60 estimates that there is a surface in the region 162 between the surfaces 160a and 160b. In this case, the surface assumption section 60 can assume the shape of the surface by interpolating the distribution of the normal vectors using a known operation method. Alternatively, the surface assumption section 60 may assume the presence of the surface in a case where the degree of polarization can be regarded as continuing from the detected surfaces 160a and 160b to the region 162. Alternatively, the surface assumption section 60 may derive, from a color image, that an opaque object, such as a window frame, is present nearby from the detected surfaces 160a and 160b to the region 162 and estimate the presence of the surface from this continuity.

As further illustrated in the figure, the surface assumption section 60 may estimate the presence of the surface and the shape thereof by checking at least one of an image distortion 164 and a specular highlight 166 in a color image. As the estimation using the image distortion 164, for example, the surface assumption section 60 estimates the state of a partial distortion 168 of an image 167 of one subject from undistorted portions, thereby estimating that a transparent object is present in front of the subject over the region 162. Further, the surface assumption section 60 estimates the shape of the surface from the degree of distortion.

Alternatively, in a case where it is possible to estimate the type of an object such as a television or a table from the image 167 of the subject, the surface assumption section 60 may estimate the presence or absence of distortion and the shape by obtaining a difference from its actual shape. For this purpose, the type of an object or the color, size, and the like for deriving the type of the object may be associated with its actual shape in a database and such a database may be prepared in advance. An object provided in the space such as a television or a table may be captured in advance, and image distortion may be detected on the basis of the difference from an image captured during operation.

As the estimation using the specular highlight 166, in a case where images (highlights) 170 of strong reflected light with luminance equal to or larger than a threshold value have been detected in the region 162, the surface assumption section 60 estimates that there is a surface there. Further, the surface assumption section 60 may separately acquire the position of a light source 172 with respect to the imaging apparatus 12 in the real space and estimate the shape of the surface on the basis of a relation with the shapes and sizes of the highlights 170. A technique for drawing the highlights with the known light source position and object shape are widely known in the field of computer graphics.

This can be used to obtain the shape of the subject by inverse operation with the known position of the light source and the known position and shape of the specular highlight. Such a method is known as inverse rendering. Here, the position of the light source can be acquired by at least one of the following methods:

1. Capture the light source itself
2. Place a sphere of color or material that reflects the light source in the subject space
3. Use a specular highlight of a subject having a known shape
4. Use the reflection on a pupil of a person in the subject space In the first method, the robot including the imaging apparatus 12 is controlled or the user is instructed to do so to capture the light source itself, so that its positional relation with the imaging apparatus 12 is acquired from the image-capturing orientation at that time. Even in a case where the approximate position of the light source is unknown, capturing images in all orientations can eventually capture the light source. In the second method, the user is instructed to place a sphere that reflects the light source in the subject space upon start of the information processing, and the position of the light source is acquired on the basis of an image on the sphere surface. For example, a sphere made of a material similar to that of a mirror can reflect an image of the light source clearly.

In the third method, a specularly reflecting object having a known shape that is present in the subject space is used instead of a silver sphere. For example, when a specular highlight is observed in a region other than the region 162 in a captured image, the three-dimensional shape of the object causing this highlight is identified. Then, the position of the light source is identified on the basis of the shape and position of the highlight. To identify the three-dimensional shape from the shape of an image of the object in the captured image, a database associating these two may be used as described above. Alternatively, the image of the object may be presented to the user via the display apparatus to make the user input the type and shape of the object.

In the fourth method, an eyeball of a person is used instead of these objects. In this case, the person's face is detected from a captured image using an existing technique, and the position of the light source is identified from a highlight in an image of the pupil in the face. In a case where, for example, the light source is attached to the imaging apparatus 12 itself or the position and attitude of the imaging apparatus 12 is continuously measured by an internal sensor or the like in a room where the arrangement of the light source is known, it is possible to acquire the position of the light source more easily. The surface assumption section 60 assumes the surface 164 and its normal vector in the undetected region 162 using at least one of the methods described above.

Figure 11:
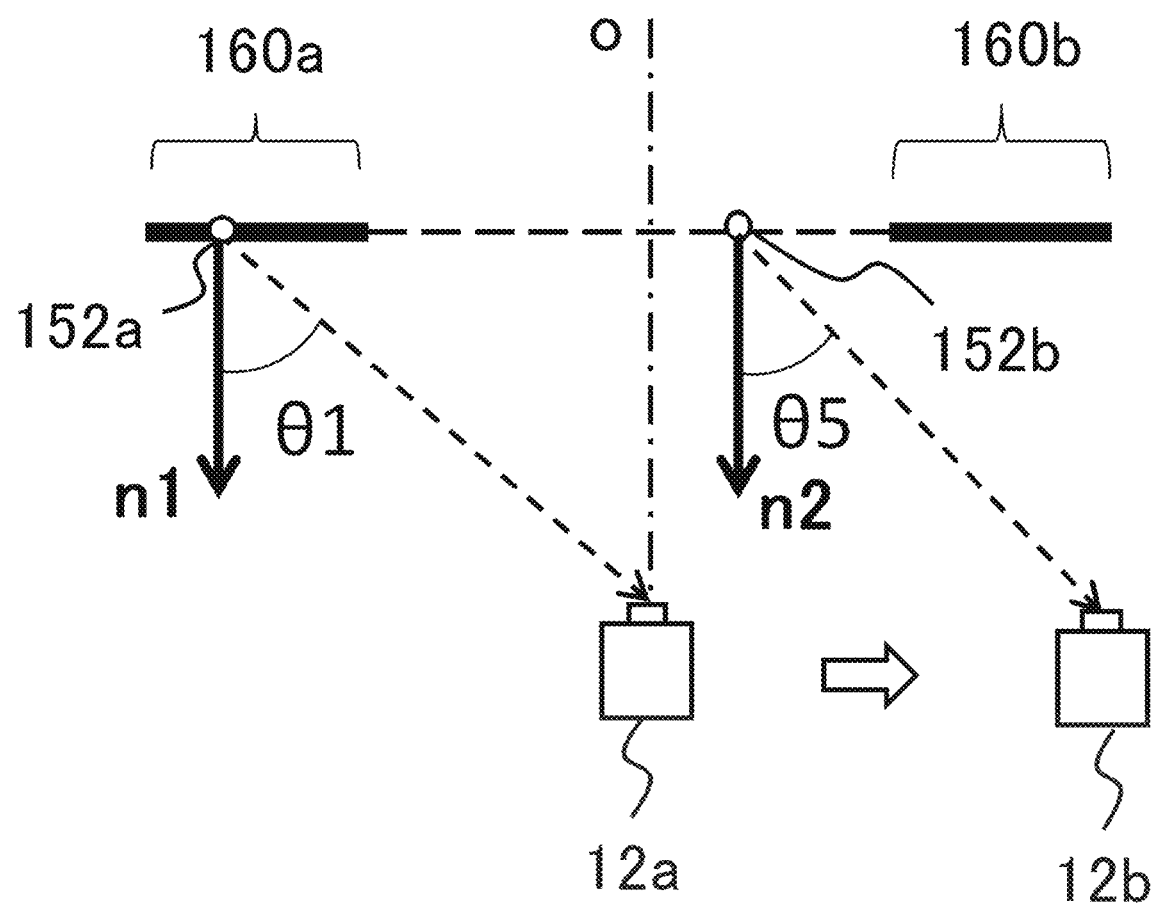
FIG. 11 is a diagram for describing a method by which a subject detection section confirms the presence of an assumed surface by causing the imaging apparatus to move in the present embodiment.

FIG. 11 is a diagram for describing a method by which the subject detection section 62 confirms the presence of the assumed surface by causing the imaging apparatus 12 to move. This figure illustrates the same case as the one illustrated in (a) of FIG. 7. That is, the surface 160a including the observation point 152a and the surface 160b have been detected from images captured at the position of an imaging apparatus 12a, and a planar surface continuing from these surfaces has been assumed to be present therebetween. In this case, the subject detection section 62 guides the robot or the user to cause the imaging apparatus 12 to move to a position and orientation where the degree of polarization larger than the threshold value can be obtained and perform image-capturing again for the assumed planar surface.

In the illustrated example, the imaging apparatus 12a is moved to the position of an imaging apparatus 12b. This increases an angle $\theta 5$ between a light beam from the observation point 152b and a normal n2, thereby increasing the degree of polarization. This, as a result, makes it possible to obtain a normal vector with high accuracy. In other words, the subject detection section 62 causes the imaging apparatus 12 to move to a position and orientation where an angle $\theta$ between a normal vector at each position on the assumed surface and a light beam therefrom falls within a predetermined range. For example, to obtain the degree of polarization of approximately 0.5 or larger, the subject detection section 62 just needs to cause the imaging apparatus 12 to move to a position where $0.6 \text{ rad} < \theta < 1.3 \text{ rad}$ is obtained.

In a case where there is a region on the assumed surface that cannot satisfy the above condition in a single movement, the imaging apparatus 12 are repeatedly moved and perform image-capturing several times to acquire the degree of polarization and a normal vector. In a case where the degree of polarization becomes high and a significant normal vector is obtained, it can be concluded that the surface of the subject is present there. In a case where there is no change in the degree of polarization even if the imaging apparatus 12 is moved in this manner, it can be concluded that there is no surface there. To cause the imaging apparatus 12 to move and perform image-capturing, the subject detection section 62 may transmit a control signal to the robot 4 via the output data generation section 56 or transmit an image or audio for indicating the moving direction and the image-capturing timing to the display apparatus to present the image or audio to the user.

Figure 12:
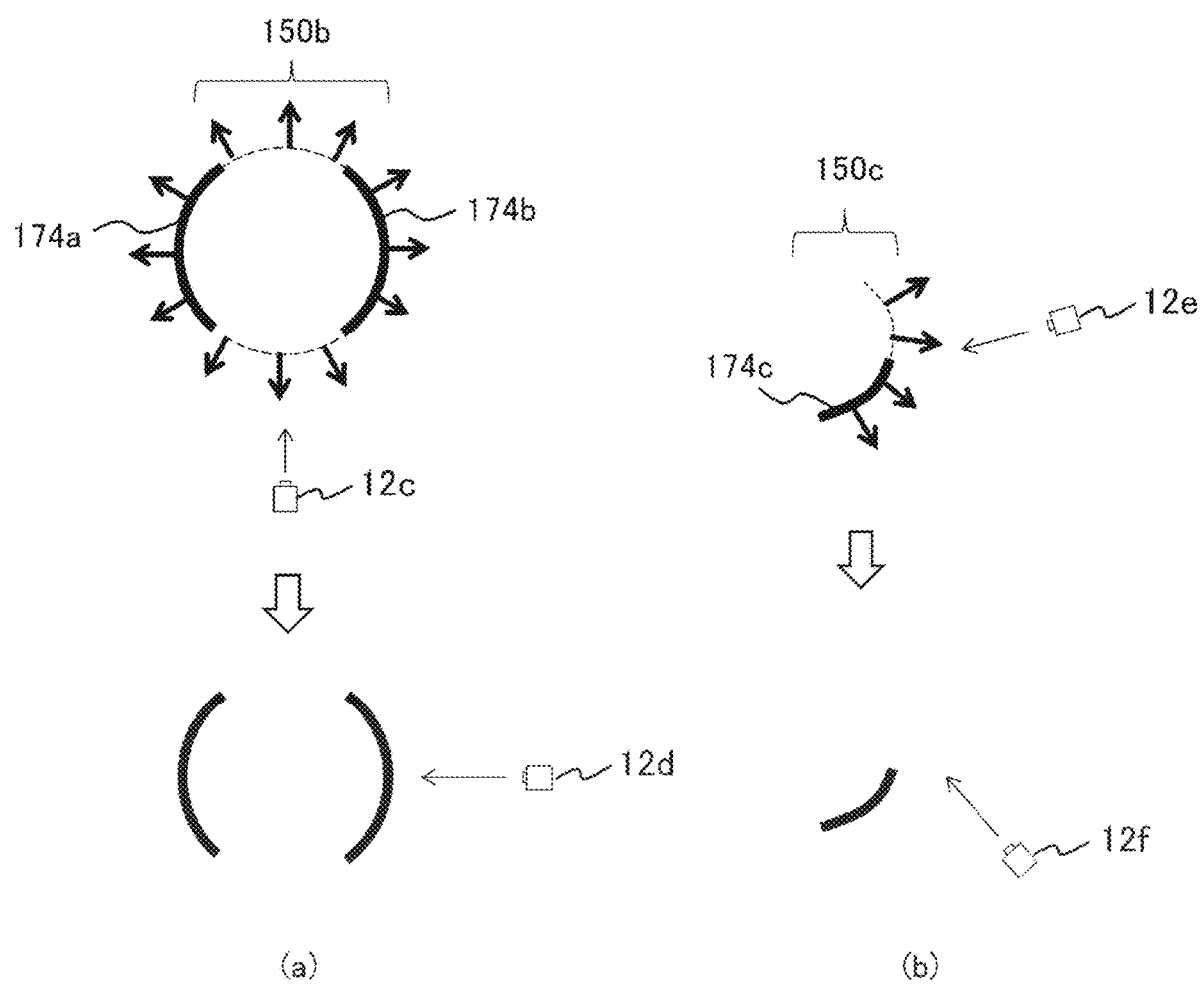
FIG. 12 depicts diagrams illustrating how surfaces are detected by causing the imaging apparatus to move with respect to various subject shapes in the present embodiment.

FIG. 12 illustrates how surfaces are detected by causing the imaging apparatus 12 to move with respect to various subject shapes. The target of (a) is the cylindrical subject 150b illustrated in (b) of FIG. 7. As described above, surfaces 174a and 174b are detected on the basis of images captured at the position of an imaging apparatus 12c. In contrast, the surface assumption section 60 assumes the presence of planar surfaces continuing from these surfaces, as denoted by the broken lines. Accordingly, the subject detection section 62 causes the imaging apparatus 12 to move to a position and orientation where the angle between a normal vector at each position on the assumed surfaces and a light beam therefrom falls within a predetermined range. From images captured by an imaging apparatus 12d after movement, the surfaces that have been undetected are detected, as denoted in gray. As a result, the entire surface of the cylindrical subject 150b can be detected.

A subject 150c having a freely selected shape is schematically illustrated as a target in (b). For example, a surface 174c is detected on the basis of images captured at the position of an imaging apparatus 12e. In contrast, the surface assumption section 60 assumes the presence of a planar surface continuing from this surface, as denoted by the broken line. Accordingly, the subject detection section 62 causes the imaging apparatus 12 to move to a position and orientation where the angle between a normal vector at each position on the assumed surface and a light beam therefrom falls within a predetermined range. From images captured by an imaging apparatus 12f after movement, the surface that has been undetected is detected, as denoted in gray. As a result, the entire surface of the subject 150c having the freely selected shape can be detected.

Figure 13:
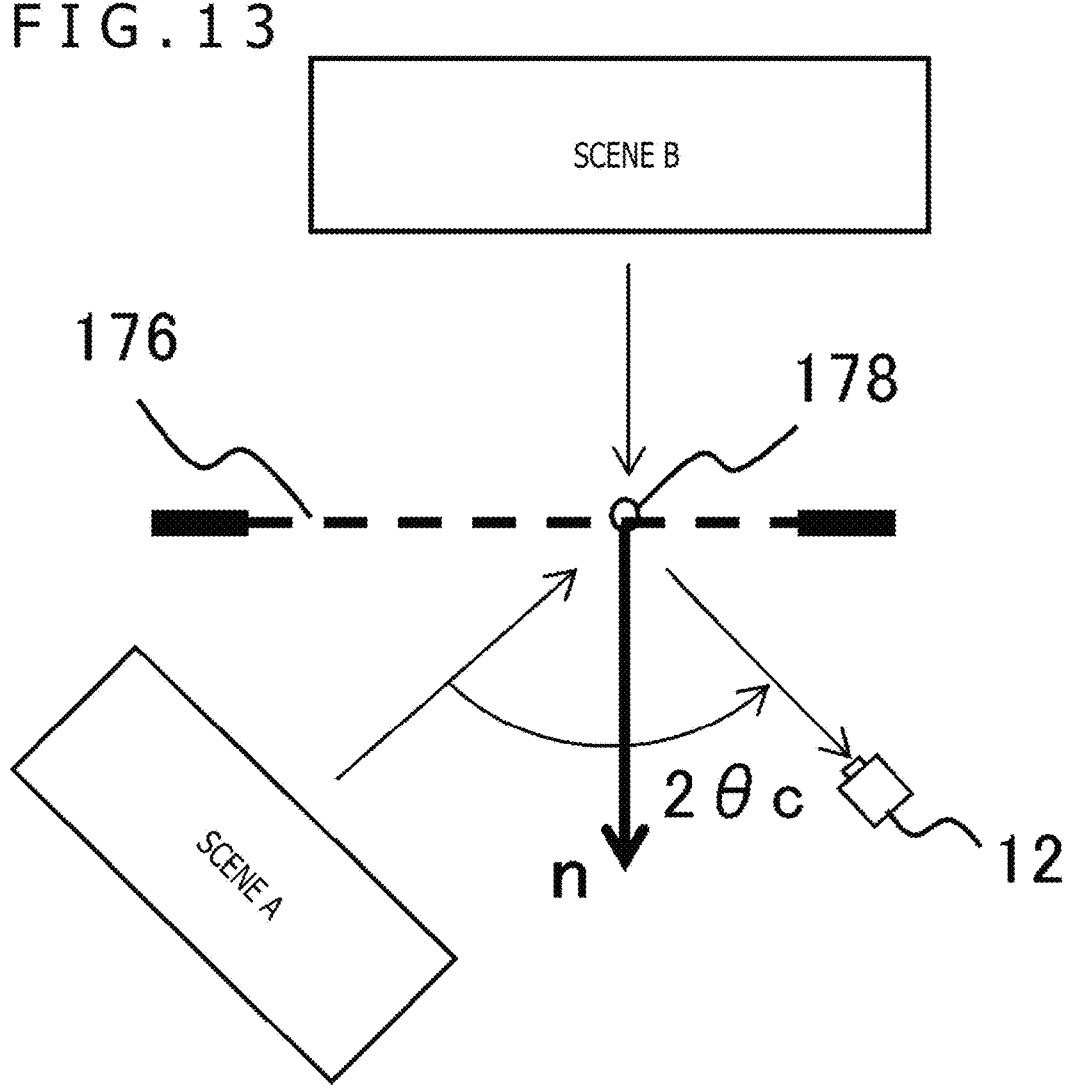
FIG. 13 is a diagram for describing another method by which the subject detection section confirms the presence of an assumed surface by causing the imaging apparatus to move in the present embodiment.

FIG. 13 is a diagram for describing another method by which the subject detection section 62 confirms the presence of an assumed surface by causing the imaging apparatus 12 to move. In this mode, a moving image is captured while the angle to a surface 176 assumed by the surface assumption section 60 is changed. For example, a moving image is captured while the imaging apparatus 12 is moved on an arc centered on at least any position 178 on the surface 176 within a range of a predetermined angle θc, that is, an angle 2θc, in both directions from a normal vector n at the position 178. Capturing a moving image while moving the imaging apparatus 12 with respect to the surface of the transparent object in this manner is likely to cause an image to change such that a specularly reflecting object in front appears while the angle between the optical axis and the surface is small, whereas an object behind appears due to transmitted light as the angle becomes closer to 90°.

In this mode, the transparent object is determined to be present in a case where there is a change in an image due to such a state transition in the region where the surface is assumed. In this case as well, the subject detection section 62 transmits a control signal to the robot 4 via the output data generation section 56 to cause the imaging apparatus 12 to capture a moving image while moving such that the angle to the surface changes. Alternatively, the subject detection section 62 generates an image or audio for instructing the user to do so and transmits the image or audio to the display apparatus. The image acquisition section 50 acquires data of the moving image captured accordingly.

From the moving image, the subject detection section 62 acquires a snapshot of a captured image at the starting point of the movement. If there is any transparent object on the surface 176, it is highly likely that an image of a "scene A" present in front is reflected on this surface due to reflection. Then, if there is any change in the image reflected on the surface 176 while the imaging apparatus 12 is moved, it is highly likely that this is a transmitted image of a "scene B" present behind the surface 176 and the state transition from the reflection to the transmission has occurred. Therefore, at this point, the subject detection section 62 can determine that there is a transparent object on the surface 176. If the imaging apparatus 12 is moved further and the "scene A" is reflected again, the state transition from the transmission to the reflection has occurred. Therefore, the accuracy of the transparent object being present on the surface 176 becomes even higher.

The change in the image can be determined by making a comparison with the snapshot acquired first. In other words, if a change other than a change in the angle of view is obtained in the snapshot, it is possible to determine that the image of the reflection has changed from the scene A to the scene B. In a case where no change other than the change in the angle of view is observed even when the imaging apparatus 12 is moved, it can be concluded that there is no transparent object on the assumed surface 176. This mode intentionally creates the reflection of an object present in front in order to use this as the basis of the presence of a transparent object. The image to be used may be a polarization image or a color image.

Figure 14:
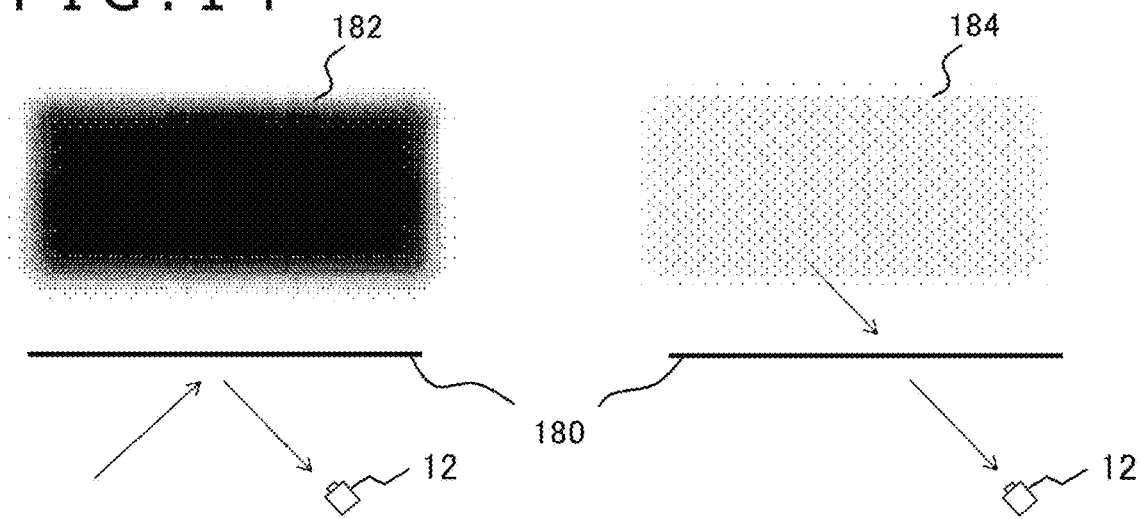
FIG. 14 depicts diagrams for describing a method by which the subject detection section confirms the presence of an assumed surface by evaluating the ratio of s-polarized light to p-polarized light in the present embodiment.

FIG. 14 depicts diagrams for describing a method by which the subject detection section 62 confirms the presence of an assumed surface by evaluating the ratio of s-polarized light to p-polarized light. In this example, the state of an object present in the background of the assumed surface and the state of a light source are known. For example, a room is captured in advance with no transparent object and the like placed therein to acquire the colors, shapes, and sizes of surrounding objects, the position of the light source, and the like. (a) of this figure illustrates a case where a black object, that is, an object 182 with an albedo lower than a predetermined value, is present as the background of an assumed surface 180. In this case, if there is any transparent object on the assumed surface 180, the imaging apparatus 12 mainly receives light specularly reflected off the surface 180.

As described above, s-polarized light is dominant in specularly reflected light. The object 182 is actually made of a material in which diffuse reflection is dominant and therefore p-polarized light should be mainly observed. However, in a case where s-polarized light has been actually mainly observed, it is possible to determine that there is a transparent object in front of the object 182. Using a similar theory, in a case where the background of the assumed surface 180 is dark and s-polarized light has been mainly observed, it is also possible to determine that there is a transparent object such as a glass window there.

As described above, s-polarized light oscillates in the direction perpendicular to the incidence plane. If the polarization orientation that gives the maximum luminance is deviated by 90° with respect to the incidence plane obtained from the normal of the estimated surface, it can be concluded that s-polarized light is dominant. (b) illustrates a case where natural light, such as ambient light, is dominant as the background of the assumed surface 180. In this case, if there is a transparent object on the assumed surface 180, the light transmitted through the surface 180 is mainly incident on the imaging apparatus 12. Although the degree of polarization of natural light is originally close to 0, the natural light transmitted through the transparent object turns into partially polarized light in which p-polarized light is dominant.

Therefore, in a case where p-polarized light has been actually mainly observed when unpolarized light should be originally observed, it is possible to determine that there is a transparent object such as a glass window on the surface 180. Further, in a case where a specularly reflecting object 184 with an albedo higher than the predetermined value is present as the background of the surface 180 and p-polarized light has been actually mainly observed when s-polarized light should be mainly observed, it is also possible to determine that there is a transparent object in front of the object 184. At this time, if the polarization orientation that gives the maximum luminance is obtained at the same angle as the incidence plane obtained from the normal of the assumed surface, it can be concluded that p-polarized light is predominant.

Figure 15:
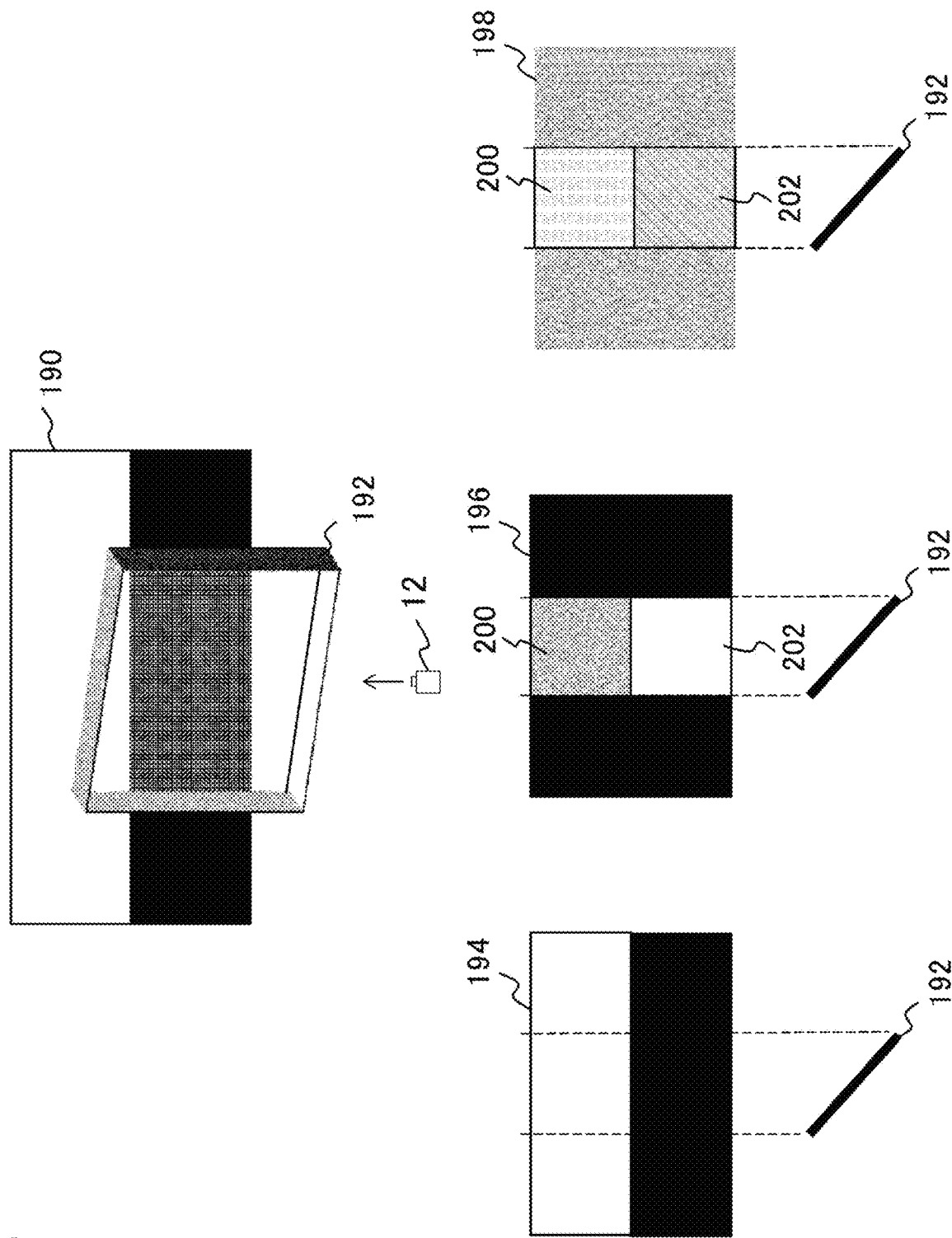
FIG. 15 is a diagram for describing a method of determining the presence or absence of a transparent object in an environment where reflected light and transmitted light can be observed simultaneously in the present embodiment.

The examples given in FIG. 14 assume a case where there is a difference between a reflection characteristic inherent in a background object and the polarization state of reflected light or transmitted light in a case where there is a transparent object and determine the presence or absence of the transparent object by using this difference. Meanwhile, simultaneously observing reflected light and transmitted light from the same transparent object can determine the presence or absence of the transparent object without limiting a material of a background object. FIG. 15 is a diagram for describing a method of determining the presence or absence of a transparent object in an environment where reflected light and transmitted light can be observed simultaneously.

The upper part of this figure illustrates a background 190 and a planar transparent object 192 in front of the background 190 as the subjects. For the purpose of description, the upper half of the background 190 is white (for example, there is an object with an albedo higher than the predetermined value) while the lower half thereof is black (for example, there is an object with an albedo lower than the predetermined value). Further, light is uniformly emitted from the imaging apparatus 12 side. The lower part of this figure illustrates a color image 194 captured by the imaging apparatus 12 in this state, and a distribution 196 of the degrees of polarization and a polarized light (p-polarized light/s-polarized light) distribution 198 which correspond to the plane of the image. In these three images (distributions), the boundaries of the region corresponding to the transparent object 192 are denoted by the broken lines.

As described above, in a case where there is an object with a white background, e.g., an object with an albedo higher than the predetermined value, light therefrom is transmitted through a transparent object. In a case where there is an object with a black background, e.g., an object with an albedo lower than the predetermined value, there is reflection of light from the front thereof. The color image 194 depicts almost no such a difference or difference resulting from the presence or absence of the transparent object, and an image obtained therefrom is such that the upper half is white and the lower half is black. In the distribution 196 of the degrees of polarization, the degree of polarization is large in a region 202 where light reflected off the transparent object 192 reaches, while the degree of polarization is smaller than that of the region 202 in a region 200 where light transmitted through the transparent object 192 reaches. This is due to the fact that the degree of polarization of specular reflection is larger than the degree of polarization of diffuse reflection, regardless of the zenith angle, as illustrated in FIG. 5.

It is noted that, in the illustrated example, since the planar surface of the transparent object 192 is inclined with respect to the imaging plane of the imaging apparatus 12, a certain degree of polarization is obtained. For this reason, the degree of polarization is even lower in regions other than the regions 200 and 202. Meanwhile, in the polarized light distribution 198, p-polarized light is dominant in the region 200 where the light transmitted through the transparent object 192 reaches, while s-polarized light is dominant in the region 202 where the light reflected off the transparent object 192 reaches. In other regions, the ratio of p-polarized light to s-polarized light is less likely to be clear since the degree of polarization is small. In a case where these properties are used to determine the presence or absence of a transparent object, the following two conditions are used.

(1) In a region (e.g., a white region) where a luminance value is higher than a predetermined value in a color image, the degree of polarization is higher than a predetermined value and p-polarized light is dominant.

(2) In a region (e.g., a black region) where a luminance value is lower than a predetermined value in the color image, the degree of polarization is higher than the predetermined value and s-polarized light is dominant.

Here, all of the "predetermined values" which are the criteria for the luminance value and the degree of polarization in (1) and (2) may be set independently of each other. Further, in a case where (1) and (2) above are satisfied simultaneously, it is determined that the transparent object 192 is present.

It is noted that, to differentiate the albedo in the background, an object having clearly divided regions may be prepared as illustrated in the figure or objects present in the subject space such as a table with an albedo higher than the predetermined value and a television with an albedo lower than the predetermined value may be used. A lighted portion and a dark portion may be used, for example. In any case, it is desirable that the subject detection section 62 adjusts the position and attitude of the imaging apparatus 12 such that the imaging apparatus 12 captures high and low albedo portions of an object present in the background and obtains the degree of polarization equal to or higher than the predetermined value in a region including the surface assumed by the surface assumption section 60.

Figure 16:
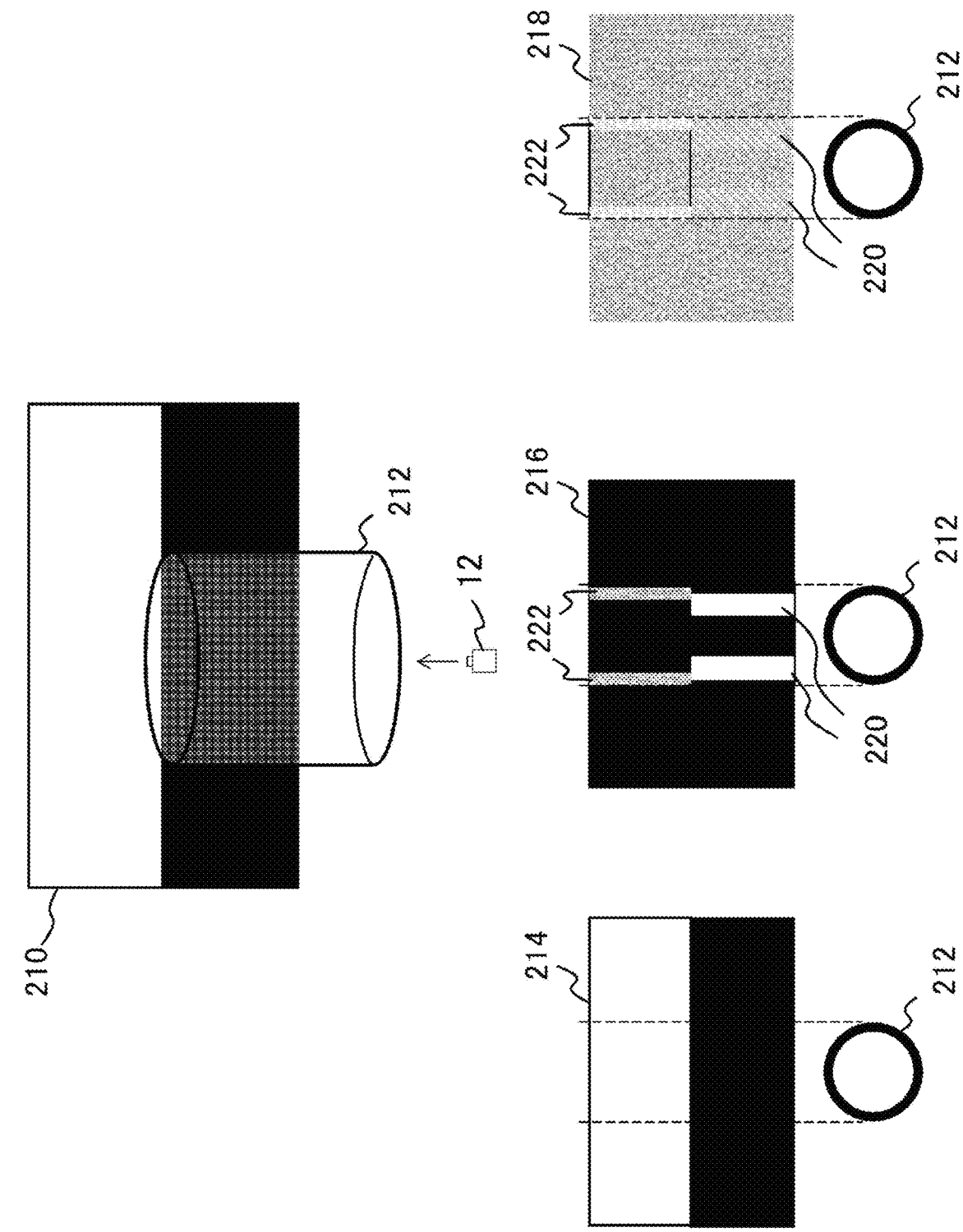
FIG. 16 is a diagram illustrating another example of determining the presence or absence of a transparent object in an environment where reflected light and transmitted light of the transparent object can be observed simultaneously in the present embodiment.

FIG. 16 illustrates another example of determining the presence or absence of a transparent object in an environment where reflected light and transmitted light of the transparent object can be observed simultaneously. In this example, a background 210 and a cylindrical transparent object 212 in front of the background 210 are captured as illustrated in the upper part. The environment of the background 210 and the light source is similar to the one in the case of FIG. 15. The lower part of this figure illustrates a color image 214 captured at that time, and a distribution 216 of the degrees of polarization and a polarized light (p-polarized light/s-polarized light) distribution 218 which correspond to the plane of the image.

In this case as well, the color image 214 reflects the background 210 and an image obtained therefrom is such that the upper half is white and the lower half is black. In the distribution 216 of the degrees of polarization, the degree of polarization is large in partial regions 220 of a region where light reflected off the transparent object 212 reaches. In partial regions 222 of a region where light transmitted through the transparent object 212 reaches, the degree of polarization is smaller than that of the regions 220. Further, the degree of polarization is even lower in other regions. The reason why the degree of polarization becomes higher in only some of the regions where the reflected or transmitted light reaches is due to the dependence on the zenith angle, as illustrated in FIG. 5.

Further, among the regions where the degree of polarization is obtained, the width of the regions 220 of the reflected light is larger than that of the regions 222 of the transmitted light. This is because, as illustrated in FIG. 5, specular reflection has a wider range in which a high degree of polarization is obtained even within the range of the same zenith angle. Meanwhile, in the polarized light distribution 218, p-polarized light is dominant in the partial regions 222 of the region where the light transmitted through the transparent object 212 reaches, while s-polarized light is dominant in the partial regions 220 of the region where the light reflected off the transparent object 212 reaches.

In other regions, the ratio of p-polarized light to s-polarized light is less likely to be clear since the degree of polarization is small. In a case where these properties are used to determine the presence or absence of a transparent object, either of the following two conditions is used.

(1) In a region (e.g., a white region) where a luminance value is higher than a predetermined value in a color image, there are regions each having a predetermined shape where the degree of polarization is higher than a predetermined value and p-polarized light is dominant.

(2) In a region (e.g., a black region) where a luminance value is lower than a predetermined value in the color image, there are regions each having a predetermined shape where the degree of polarization is higher than the predetermined value and s-polarized light is dominant.

Here, all of the "predetermined values" which are the criteria for the luminance value and the degree of polarization in (1) and (2) may be set independently of each other. In a case where at least one of (1) and (2) above is satisfied, it is determined that these regions correspond to images of edge portions of the transparent object 212 and that the transparent object is present therebetween. Here, the "predetermined shape" is defined in advance on the basis of the shape of an expected transparent object. In the case of the cylindrical object illustrated in the figure, the cylindrical object has a rectangular or substantially rectangular shape with an aspect ratio that satisfies a predetermined condition. Further, the orientation of the cylinder is also identified from the orientations of the regions. In this mode as well, it is desirable that the subject detection section 62 adjusts the position and attitude of the imaging apparatus 12 such that the imaging apparatus 12 captures high and low albedo portions of an object present in the background.

Figure 17:
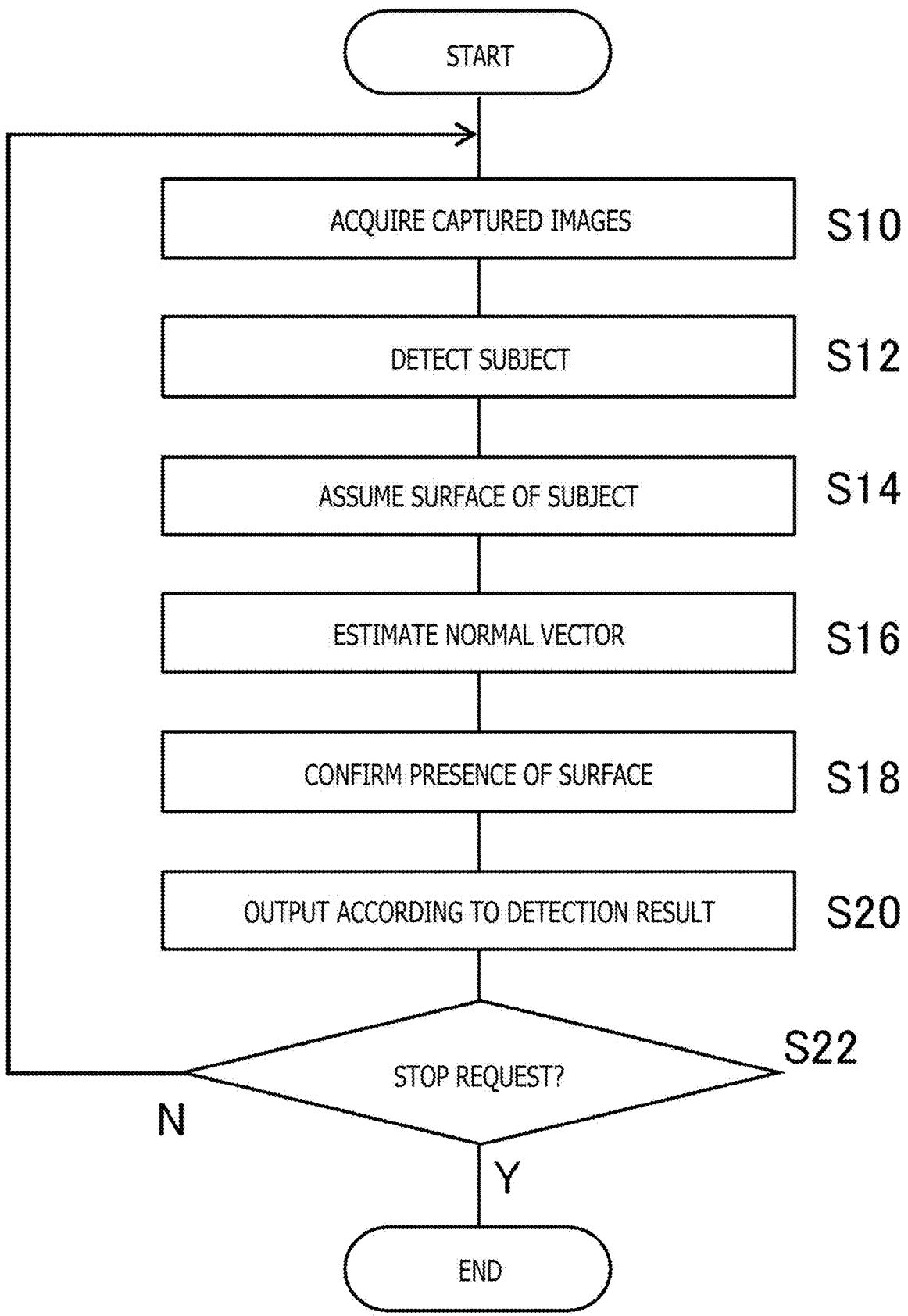
FIG. 17 is a flowchart illustrating a processing procedure for the information processing apparatus according to the present embodiment to detect a subject using captured images.

Next, the operation that can be realized by the above-described configurations will be described. FIG. 17 is a flowchart illustrating a processing procedure for the information processing apparatus 10 to detect a subject using captured images. This flowchart starts while the imaging apparatus 12 is capturing images of a subject space including polarization images. First, the image acquisition section 50 of the information processing apparatus 10 acquires data of captured images including the polarization images (S10). Then, the normal acquisition section 58 of the image analysis section 54 detects the subject using at least the polarization images by a general method (S12). Specifically, the normal acquisition section 58 obtains the distributions of the degrees of polarization and normal vectors on the basis of the luminance characteristics of the polarization images according to the procedure described above.

At this time, the normal acquisition section 58 may extract a region of an image of the subject on the basis of color information using a color image. Further, the normal acquisition section 58 may obtain the distance to the subject using stereo images. Next, the surface assumption section 60 assumes the presence of such a surface as to be extended from the surface detected in S10 in the direction in which the angle to the optical axis of the imaging apparatus 12 becomes small (S14). Specifically, as described above, the surface assumption section 60 determines that the probability of the presence of an undetected surface is high in a case where predetermined conditions are satisfied. The predetermined conditions are conditions that can determine that there is continuity in the distributions of the degrees of polarization and normal vectors, the distance to the subject, an image of an object such as a frame in the surroundings, or the like.

Next, the surface assumption section 60 estimates a normal vector of the assumed surface (S16). For this processing, the surface assumption section 60 uses the image distortion, the position and shape of a specular highlight, and the like illustrated in FIG. 10. Alternatively, the surface assumption section 60 may interpolate the normal vectors of the detected surface. Next, the subject detection section 62 confirms whether or not the assumed surface is actually present (S18). That is, the subject detection section 62 attempts to acquire the normal vector using polarization images in the plurality of orientations captured again within a range where the degree of polarization larger than the threshold value is obtained while changing the position and attitude of the imaging apparatus 12.

Alternatively, the subject detection section 62 confirms whether or not there is any change in the image appearing in the region of the surface by continuously capturing images of the assumed surface from different angles. Alternatively, the subject detection section 62 identifies whether or not the light is transmitted light or reflected light of the transparent object on the basis of the degree of polarization and the polarization state. The subject detection section 62 determines whether or not the surface is actually present on the assumed surface by using at least any of these methods. It is noted that, as long as the normal vector of the transparent object is acquired by interpolation processing or the like in S18, the normal vector estimated in S16 is not necessarily precise.

The output data generation section 56 performs predetermined information processing on the basis of the determined results, that is, the presence of the entire subject, its position, its attitude, the distribution of the normal vectors, and the like, and then generates this result as output data and outputs the result to the robot 4 or the display apparatus as needed (S20). If it is not necessary to stop the processing in response to a request from the user or the like (N in S22), the processing from S10 to S20 is repeated. The entire processing is stopped in response to the need to stop the processing (Y in S22).

According to the present embodiment described above, normal vectors of an object are obtained using polarization images in the object detection technique using the captured images. At this time, the presence of a surface that has been unable to be detected due to an insufficient degree of polarization is assumed. Then, the presence of the assumed surface is confirmed by performing predetermined measures using an estimated normal vector. Specifically, the imaging apparatus is caused to move to a suitable position and perform image-capturing, and it is identified, on the basis of the degree of polarization and polarization state, whether or not the light is reflected light/transmitted light from the transparent object.

This makes it possible to detect, without missing, an object with high light transmittance that is difficult to be detected with a general color image. Without limiting the type of object, the detection result can be used in the information processing. As a result, the accuracy and versatility of robot control, electronic content processing, inspection processing, monitoring, and the like, for example, can be increased.

The present invention has been described above on the basis of the embodiment. The above-described embodiment is an exemplification, and it will be understood by those skilled in the art that various modifications can be made to combinations of each constituent component and each processing process in the embodiment and that such modifications also fall within the scope of the present invention.

REFERENCE SIGNS LIST

10 Information processing apparatus, 12 Imaging apparatus, 23 CPU, 24 GPU, 26 Main memory, 50 Image acquisition section, 52 Image data storage section, 54 Image analysis section, 56 Output data generation section, 58 Normal acquisition section, 60 Surface assumption section, 62 Subject detection section.

INDUSTRIAL APPLICABILITY

The present invention, as described above, can be used in various types of information processing apparatuses and systems such as robot control apparatuses, electronic content processing apparatuses, mobile terminals, surveillance camera systems, and inspection apparatuses.

The invention claimed is:

1. An information processing apparatus comprising:
an image acquisition section configured to acquire, from an imaging apparatus, data of polarization images in a plurality of orientations;
a normal acquisition section configured to detect a surface of a subject by acquiring a normal vector using the polarization images;
a surface assumption section configured to assume presence of an undetected surface continuing from the detected surface;
a subject detection section configured to confirm, using a normal vector estimated for the assumed surface, whether or not the surface is present and derive a definitive surface of the subject; and
an output data generation section configured to generate output data and output the output data on a basis of information regarding the derived surface of the subject, wherein at least one of:
(i) the image acquisition section further acquires a moving image of a color image or a polarization image captured by the imaging apparatus while an angle of the imaging apparatus to the assumed surface is changed, and when the subject detection section has confirmed, in the moving image, that there is a change in an image due to a state transition between reflection and transmission in a region of the assumed surface, the subject detection section determines that there is a transparent object on the surface,
(ii) the subject detection section determines whether or not a transparent object is present on the assumed surface by discriminating whether light is from the transparent object present on the surface or from an object present behind the surface on a basis of a characteristic of polarization luminance in a region on an image plane corresponding to the surface,
(iii) in a case where a region on an image plane corresponding to the assumed surface includes a region having a predetermined shape where a degree of polarization is higher than a predetermined value, the subject detection section determines presence of a transparent object having an edge portion corresponding to the region,
(iv) the surface assumption section determines a surface of a transparent object to be assumed on a basis of a distortion of an image of an object present in a subject space,
(v) the surface assumption section determines a surface of a transparent object to be assumed on a basis of a position and a shape of a specular highlight captured by the imaging apparatus and a position of a light source, and
(vi) the surface assumption section determines a surface of a transparent object to be assumed on a basis of a range in which an opaque object detected on a basis of color information of the subject extends from the detected surface.

2. The information processing apparatus according to claim 1,
wherein the image acquisition section further acquires data of polarization images in the plurality of orientations captured again in a state where an angle between a normal estimated for the assumed surface and a light beam to the imaging apparatus falls within a predetermined range, and
the subject detection section confirms whether or not the assumed surface is present by attempting to acquire the normal vector using the polarization images.

3. The information processing apparatus according to claim 2, wherein the output data generation section transmits, to a robot including the imaging apparatus, a control signal for realizing such a state that the imaging apparatus is positioned within the predetermined range, or transmits, to a display apparatus, data representing an instruction to a user to realize the state.

4. The information processing apparatus according to claim 1, wherein the subject detection section performs the discrimination by checking whether or not the light is light specularly reflected off the transparent object on a basis of the characteristic of the polarization luminance in a case where a luminance value of an image is lower than a predetermined value in the region of the assumed surface.

5. The information processing apparatus according to claim 1, wherein the subject detection section performs the discrimination by checking whether or not the light is light transmitted through the transparent object on a basis of the characteristic of the polarization luminance in a case where a luminance value of an image is higher than a predetermined value in the region of the assumed surface.

6. The information processing apparatus according to claim 1, wherein the surface assumption section estimates presence or absence of the distortion of the image by identifying an actual shape of the object using a database on a basis of a type of the object.

7. The information processing apparatus according to claim 1, wherein the surface assumption section identifies a positional relation between the imaging apparatus and the light source on a basis of an image-capturing orientation when the light source is captured or a reflection on a surface of an object having a known shape that is present in a subject space.

8. An object detection method performed by an information processing apparatus, the object detection method comprising:
acquiring, from an imaging apparatus, data of polarization images in a plurality of orientations;
detecting a surface of a subject by acquiring a normal vector using the polarization images;
assuming presence of an undetected surface continuing from the detected surface;
confirming, using a normal vector estimated for the assumed surface, whether or not the surface is present and deriving a definitive surface of the subject; and generating and outputting output data on a basis of information regarding the derived surface of the subject, wherein at least one of:
(i) the acquiring includes acquiring a moving image of a color image or a polarization image captured by the imaging apparatus while an angle of the imaging apparatus to the assumed surface is changed, and when the subject detection section has confirmed, in the moving image, that there is a change in an image due to a state transition between reflection and transmission in a region of the assumed surface, the subject detection section determines that there is a transparent object on the surface,
(ii) the confirming includes determining whether or not a transparent object is present on the assumed surface by discriminating whether light is from the transparent object present on the surface or from an object present behind the surface on a basis of a characteristic of polarization luminance in a region on an image plane corresponding to the surface,
(iii) in a case where a region on an image plane corresponding to the assumed surface includes a region having a predetermined shape where a degree of polarization is higher than a predetermined value, the detecting includes determining presence of a transparent object having an edge portion corresponding to the region,
(iv) the assuming includes determining a surface of a transparent object to be assumed on a basis of a distortion of an image of an object present in a subject space,
(v) the assuming includes determining a surface of a transparent object to be assumed on a basis of a position and a shape of a specular highlight captured by the imaging apparatus and a position of a light source, and
(vi) the assuming includes determining a surface of a transparent object to be assumed on a basis of a range in which an opaque object detected on a basis of color information of the subject extends from the detected surface.

9. A non-transitory, computer readable storage medium containing a computer program, which when executed by a computer, causes the computer to perform an object detection method by carrying out actions, comprising:
acquiring, from an imaging apparatus, data of polarization images in a plurality of orientations;
detecting a surface of a subject by acquiring a normal vector using the polarization images;
assuming presence of an undetected surface continuing from the detected surface;
confirming, using a normal vector estimated for the assumed surface, whether or not the surface is present and deriving a definitive surface of the subject; and
generating and outputting output data on a basis of information regarding the derived surface of the subject, wherein at least one of:
(i) the acquiring includes acquiring a moving image of a color image or a polarization image captured by the imaging apparatus while an angle of the imaging apparatus to the assumed surface is changed, and when the subject detection section has confirmed, in the moving image, that there is a change in an image due to a state transition between reflection and transmission in a region of the assumed surface, the subject detection section determines that there is a transparent object on the surface,
(ii) the confirming includes determining whether or not a transparent object is present on the assumed surface by discriminating whether light is from the transparent object present on the surface or from an object present behind the surface on a basis of a characteristic of polarization luminance in a region on an image plane corresponding to the surface,
(iii) in a case where a region on an image plane corresponding to the assumed surface includes a region having a predetermined shape where a degree of polarization is higher than a predetermined value, the detecting includes determining presence of a transparent object having an edge portion corresponding to the region,
(iv) the assuming includes determining a surface of a transparent object to be assumed on a basis of a distortion of an image of an object present in a subject space,
(v) the assuming includes determining a surface of a transparent object to be assumed on a basis of a position and a shape of a specular highlight captured by the imaging apparatus and a position of a light source, and
(vi) the assuming includes determining a surface of a transparent object to be assumed on a basis of a range in which an opaque object detected on a basis of color information of the subject extends from the detected surface.

* * * * *